United States Patent
Jones

(10) Patent No.: US 9,471,759 B2
(45) Date of Patent: Oct. 18, 2016

(54) ENABLING DEVICE FUNCTIONALITY BASED ON INDOOR POSITIONING SYSTEM DETECTION OF PHYSICAL CUSTOMER PRESENCE

(71) Applicant: Bank of America Corporation, Charlotte, NC (US)

(72) Inventor: Alicia C. Jones, Fort Mill, SC (US)

(73) Assignee: Bank of America Corporation, Charlotte, NC (US)

(*) Notice: Subject to any disclaimer, the term of this patent is extended or adjusted under 35 U.S.C. 154(b) by 14 days.

(21) Appl. No.: 14/327,561

(22) Filed: Jul. 10, 2014

(65) Prior Publication Data

US 2016/0012214 A1    Jan. 14, 2016

(51) Int. Cl.
| | |
|---|---|
| *H04L 29/00* | (2006.01) |
| *G06F 21/30* | (2013.01) |
| *H04W 4/04* | (2009.01) |
| *G06F 21/62* | (2013.01) |

(52) U.S. Cl.
CPC ............ *G06F 21/30* (2013.01); *G06F 21/629* (2013.01); *H04W 4/04* (2013.01); *G06F 2221/2111* (2013.01); *G06F 2221/2141* (2013.01)

(58) Field of Classification Search
CPC ....... G06Q 20/32; H04L 67/18; H04W 4/02; H04W 4/043; G07F 19/20
See application file for complete search history.

(56) References Cited

U.S. PATENT DOCUMENTS

| | | |
|---|---|---|
| 5,581,630 A | 12/1996 | Bonneau, Jr. |
| 5,991,749 A | 11/1999 | Morrill, Jr. |
| 6,738,628 B1 | 5/2004 | McCall et al. |
| 6,845,361 B1 | 1/2005 | Dowling |
| 7,047,560 B2 | 5/2006 | Fishman et al. |
| 7,111,174 B2 | 9/2006 | Hamid |
| 7,149,533 B2 | 12/2006 | Laird et al. |
| 7,536,316 B2 | 5/2009 | Ozer et al. |
| 7,536,722 B1 | 5/2009 | Saltz et al. |
| 7,543,738 B1 | 6/2009 | Saunders et al. |
| 7,712,657 B1 | 5/2010 | Block et al. |
| 7,774,076 B2 | 8/2010 | Skowronek |
| 7,814,016 B2 | 10/2010 | Pranger |
| 7,904,718 B2 | 3/2011 | Giobbi et al. |
| 7,911,334 B2 | 3/2011 | Busey |

(Continued)

FOREIGN PATENT DOCUMENTS

KR    20090050383 A    5/2009

OTHER PUBLICATIONS

US 5,513,015, 04/1996, Ogasawara (withdrawn)

(Continued)

*Primary Examiner* — Brandon Hoffman
*Assistant Examiner* — Helai Salehi
(74) *Attorney, Agent, or Firm* — Banner & Witcoff, Ltd.; Michael A. Springs

(57) ABSTRACT

A computing platform may receive a plurality of messages comprising data indicating physical presence of customers at a physical location from an indoor positioning system located at the physical location. Responsive to receiving the plurality of messages comprising the data indicating the physical presence of the customers at the physical location, the computing platform may determine that one or more customers of the customers at the physical location are authorized to utilize one or more functions of one or more computing devices physically located at the physical location.

20 Claims, 10 Drawing Sheets

(56) References Cited

U.S. PATENT DOCUMENTS

| | | |
|---|---|---|
| 7,912,843 B2 | 3/2011 | Murdock et al. |
| 7,979,899 B2 | 7/2011 | Guo et al. |
| 8,009,013 B1 | 8/2011 | Hirschfeld et al. |
| 8,055,551 B2 | 11/2011 | Milgramm et al. |
| 8,073,460 B1 | 12/2011 | Scofield et al. |
| 8,091,778 B1 | 1/2012 | Block et al. |
| 8,145,649 B2 | 3/2012 | Murdock et al. |
| 8,186,578 B1 | 5/2012 | Block et al. |
| 8,201,729 B1 | 6/2012 | Block et al. |
| 8,229,787 B2 | 7/2012 | Ramchandani et al. |
| 8,259,692 B2 | 9/2012 | Bajko |
| 8,260,707 B2 | 9/2012 | Treadwell et al. |
| 8,295,898 B2 | 10/2012 | Ashfield et al. |
| 8,332,232 B2 | 12/2012 | Nickerson et al. |
| 8,369,266 B2 | 2/2013 | Jin et al. |
| 8,401,897 B1 | 3/2013 | Chatterjee |
| 8,413,891 B2 | 4/2013 | Long |
| 8,467,768 B2 | 6/2013 | Mahaffey et al. |
| 8,583,933 B2 | 11/2013 | Granbery |
| 8,590,028 B2 | 11/2013 | Saxena et al. |
| 8,606,712 B2 | 12/2013 | Choudhuri et al. |
| 8,666,821 B2 | 3/2014 | Xie et al. |
| 8,671,001 B1 | 3/2014 | Thompson et al. |
| 8,742,894 B2 | 6/2014 | Seydoux |
| 9,204,257 B1 | 12/2015 | Mendelson |
| 2006/0119469 A1 | 6/2006 | Hirai et al. |
| 2007/0186258 A1 | 8/2007 | Dapper et al. |
| 2007/0186261 A1 | 8/2007 | Geile et al. |
| 2007/0192815 A1 | 8/2007 | Geile et al. |
| 2007/0195689 A1 | 8/2007 | Dapper et al. |
| 2007/0195901 A1 | 8/2007 | Geile et al. |
| 2007/0195902 A1 | 8/2007 | Geile et al. |
| 2007/0201573 A1 | 8/2007 | Geile et al. |
| 2007/0206693 A1 | 9/2007 | Geile et al. |
| 2008/0052151 A1 | 2/2008 | Xie et al. |
| 2008/0114697 A1 | 5/2008 | Black et al. |
| 2009/0252318 A1 | 10/2009 | Smith et al. |
| 2009/0259499 A1 | 10/2009 | Bhojwani et al. |
| 2009/0328052 A1* | 12/2009 | Nguyen ............ G06Q 20/32 718/104 |
| 2009/0328182 A1 | 12/2009 | Malakapalli et al. |
| 2010/0017874 A1 | 1/2010 | Piccinini et al. |
| 2010/0042541 A1 | 2/2010 | Kang et al. |
| 2010/0191581 A1 | 7/2010 | Furin et al. |
| 2010/0198725 A1 | 8/2010 | Naccache |
| 2010/0205063 A1 | 8/2010 | Mersky |
| 2010/0277276 A1 | 11/2010 | Bayne et al. |
| 2010/0287250 A1 | 11/2010 | Carlson et al. |
| 2011/0086646 A1 | 4/2011 | Gupta et al. |
| 2011/0202377 A1 | 8/2011 | Maiya et al. |
| 2011/0208657 A1 | 8/2011 | Rao |
| 2011/0246306 A1 | 10/2011 | Blackhurst et al. |
| 2011/0313804 A1 | 12/2011 | Camp et al. |
| 2011/0321031 A1 | 12/2011 | Dournov et al. |
| 2012/0004769 A1 | 1/2012 | Hallenbeck et al. |
| 2012/0047072 A1 | 2/2012 | Larkin |
| 2012/0070041 A1 | 3/2012 | Wang |
| 2012/0076183 A1 | 3/2012 | Dapper et al. |
| 2012/0078673 A1 | 3/2012 | Koke et al. |
| 2012/0078741 A1 | 3/2012 | DeLine |
| 2012/0116929 A1 | 5/2012 | Gventer et al. |
| 2012/0130840 A1 | 5/2012 | Carlier et al. |
| 2012/0136479 A1 | 5/2012 | Signorelli et al. |
| 2012/0143755 A1 | 6/2012 | Burrell |
| 2012/0158297 A1 | 6/2012 | Kim et al. |
| 2012/0195184 A1 | 8/2012 | Dapper et al. |
| 2012/0197773 A1 | 8/2012 | Grigg et al. |
| 2012/0197797 A1 | 8/2012 | Grigg et al. |
| 2012/0197798 A1 | 8/2012 | Grigg et al. |
| 2012/0203892 A1 | 8/2012 | Pignataro et al. |
| 2012/0271692 A1 | 10/2012 | Huang et al. |
| 2012/0278115 A1 | 11/2012 | Acharya et al. |
| 2012/0278234 A1 | 11/2012 | Dent et al. |
| 2012/0320199 A1 | 12/2012 | Kundu et al. |
| 2012/0320214 A1 | 12/2012 | Kundu et al. |
| 2012/0321146 A1 | 12/2012 | Kundu et al. |
| 2012/0323642 A1 | 12/2012 | Camp et al. |
| 2013/0005253 A1 | 1/2013 | Grigg et al. |
| 2013/0030915 A1 | 1/2013 | Statler et al. |
| 2013/0045758 A1 | 2/2013 | Khorashadi et al. |
| 2013/0048724 A1 | 2/2013 | Burnside et al. |
| 2013/0104214 A1 | 4/2013 | Beck et al. |
| 2013/0121131 A1 | 5/2013 | Dapper et al. |
| 2013/0138497 A1 | 5/2013 | Yan et al. |
| 2013/0150006 A1 | 6/2013 | Nunally et al. |
| 2013/0159195 A1 | 6/2013 | Kirillin et al. |
| 2013/0165154 A1 | 6/2013 | Joshi |
| 2013/0173387 A1 | 7/2013 | Adelaar |
| 2013/0173404 A1 | 7/2013 | Scipioni |
| 2013/0173492 A1 | 7/2013 | Leavenworth et al. |
| 2013/0182114 A1 | 7/2013 | Zhang et al. |
| 2013/0182904 A1 | 7/2013 | Zhang et al. |
| 2013/0203383 A1 | 8/2013 | Stopel et al. |
| 2013/0211718 A1 | 8/2013 | Yoo et al. |
| 2013/0217416 A1 | 8/2013 | Matthews, III et al. |
| 2013/0238497 A1 | 9/2013 | Ramachandran et al. |
| 2013/0246301 A1 | 9/2013 | Radhakrishnan et al. |
| 2013/0253818 A1 | 9/2013 | Sanders et al. |
| 2013/0261964 A1 | 10/2013 | Goldman et al. |
| 2013/0275163 A1 | 10/2013 | Kaiser |
| 2013/0282744 A1 | 10/2013 | Hartman et al. |
| 2013/0297422 A1 | 11/2013 | Hunter et al. |
| 2013/0300541 A1 | 11/2013 | Pesonen et al. |
| 2013/0310081 A1 | 11/2013 | Chu |
| 2013/0317778 A1 | 11/2013 | Gupta et al. |
| 2013/0325587 A1 | 12/2013 | Kothari et al. |
| 2013/0328725 A1 | 12/2013 | Wuoti et al. |
| 2013/0332271 A1 | 12/2013 | Hay |
| 2013/0346189 A1 | 12/2013 | Isaacs |
| 2014/0006219 A1 | 1/2014 | Wouhaybi et al. |
| 2014/0020073 A1 | 1/2014 | Ronda et al. |
| 2014/0032297 A1 | 1/2014 | Germann et al. |
| 2014/0032345 A1 | 1/2014 | Moore |
| 2014/0039950 A1 | 2/2014 | Appel et al. |
| 2014/0039951 A1 | 2/2014 | Appel et al. |
| 2014/0046830 A1 | 2/2014 | Orozco et al. |
| 2014/0058914 A1 | 2/2014 | Song et al. |
| 2014/0068785 A1 | 3/2014 | Gventer et al. |
| 2014/0074800 A1 | 3/2014 | Gventer et al. |
| 2014/0105263 A1 | 4/2014 | Geile |
| 2014/0110481 A1 | 4/2014 | Burnside et al. |
| 2014/0114877 A1 | 4/2014 | Montano |
| 2014/0201025 A1 | 7/2014 | Adoni et al. |
| 2014/0222603 A1 | 8/2014 | Hay |
| 2014/0258028 A1 | 9/2014 | Bynum et al. |
| 2014/0270108 A1 | 9/2014 | Riahi et al. |
| 2014/0270109 A1 | 9/2014 | Riahi et al. |
| 2014/0270146 A1 | 9/2014 | Riahi et al. |
| 2014/0279450 A1 | 9/2014 | Gujral |
| 2014/0297527 A1 | 10/2014 | McLaughlin et al. |
| 2014/0309770 A1 | 10/2014 | Signorelli et al. |
| 2015/0059002 A1* | 2/2015 | Balram ............... G06F 3/011 726/28 |
| 2015/0089585 A1 | 3/2015 | Novack |

OTHER PUBLICATIONS

Statement RE: Related Applications dated Jul. 10, 2015.

\* cited by examiner

ENABLING DEVICE FUNCTIONALITY BASED ON INDOOR POSITIONING SYSTEM DETECTION OF PHYSICAL CUSTOMER PRESENCE

BACKGROUND

For most organizations, delivering prompt, high-quality customer service is of paramount importance. As technology evolves, organizations are utilizing computing devices in new ways to improve their customers' experiences. For example, organizations are routinely identifying ways to automate processes that once required a customer to interact with a representative of the organization, and are thereby providing customers that choose to utilize such automated processes with an additional avenue for obtaining customer service. Accordingly, a need exists for enabling device functionality based on indoor positioning system detection of physical customer presence.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In accordance with one or more embodiments, a computing platform may receive a plurality of messages comprising data indicating physical presence of customers of a financial institution at a physical banking center location of the financial institution from an indoor positioning system located at the physical banking center location of the financial institution. Responsive to receiving the plurality of messages comprising the data indicating the physical presence of the customers of the financial institution at the physical banking center location of the financial institution, the computing platform may determine that one or more customers of the customers of the financial institution at the physical banking center location of the financial institution are authorized to utilize one or more functions of one or more computing devices physically located at the physical banking center location of the financial institution.

In some embodiments, responsive to determining that the one or more customers of the customers of the financial institution at the physical banking center location of the financial institution are authorized to utilize the one or more functions of the one or more computing devices physically located at the physical banking center location of the financial institution the computing platform may identify the one or more computing devices physically located at the physical banking center location of the financial institution and the one or more functions of the one or more computing devices physically located at the physical banking center location of the financial institution based on at least a portion of the data indicating the physical presence of the customers of the financial institution at the physical banking center location of the financial institution.

In some embodiments, the computing platform may generate one or more messages comprising data identifying the one or more computing devices physically located at the physical banking center location of the financial institution, identifying the one or more functions of the one or more computing devices physically located at the physical banking center location of the financial institution, and instructing the one or more computing devices physically located at the physical banking center location of the financial institution to enable the one or more functions of the one or more computing devices physically located at the physical banking center location of the financial institution for the one or more customers of the customers of the financial institution at the physical banking center location of the financial institution. In such embodiments, the computing platform may communicate the one or more messages comprising the data identifying the one or more computing devices physically located at the physical banking center location of the financial institution, identifying the one or more functions of the one or more computing devices physically located at the physical banking center location of the financial institution, and instructing the one or more computing devices physically located at the physical banking center location of the financial institution to enable the one or more functions of the one or more computing devices physically located at the physical banking center location of the financial institution for the one or more customers of the customers of the financial institution at the physical banking center location of the financial institution to the one or more computing devices physically located at the physical banking center location of the financial institution.

In some embodiments, the computing platform may receive one or more messages comprising data indicating that the one or more functions of the one or more computing devices physically located at the physical banking center location of the financial institution have been enabled for the or more customers of the customers of the financial institution at the physical banking center location of the financial institution from the one or more computing devices physically located at the physical banking center location of the financial institution. In such embodiments, responsive to receiving the one or more messages comprising the data indicating that the one or more functions of the one or more computing devices physically located at the physical banking center location of the financial institution have been enabled for the or more customers of the customers of the financial institution at the physical banking center location of the financial institution, the computing platform may generate one or more messages indicating that the one or more functions of the one or more computing devices physically located at the physical banking center location of the financial institution have been enabled for the or more customers of the customers of the financial institution at the physical banking center location of the financial institution.

In some embodiments, the computing platform may identify one or more personal computing devices presently in possession of the one or more customers of the customers of the financial institution at the physical banking center location of the financial institution based on at least a portion of the data indicating the physical presence of the customers of the financial institution at the physical banking center location of the financial institution. The computing platform may communicate the one or more messages indicating that the one or more functions of the one or more computing devices physically located at the physical banking center location of the financial institution have been enabled for the or more customers of the customers of the financial institution at the physical banking center location of the financial institution to the one or more personal computing devices presently in possession of the one or more customers of the customers of the financial institution at the physical banking center location of the financial institution.

In some embodiments, the one or more computing devices physically located at the physical banking center location of the financial institution may include a computing device associated with a deposit drop box physically located at the physical banking center location of the financial institution. In such embodiments, the one or more customers of the customers of the financial institution at the physical banking center location of the financial institution may include a customer of the financial institution authorized to make deposits at the physical banking center location of the financial institution via the deposit drop box physically located at the physical banking center location of the financial institution. The one or more functions of the one or more computing devices physically located at the physical banking center location of the financial institution may include a function configured to prepare the deposit drop box physically located at the physical banking center location of the financial institution to receive a deposit from the customer of the financial institution authorized to make deposits at the physical banking center location of the financial institution via the deposit drop box physically located at the physical banking center location of the financial institution. Generating the one or more messages comprising the data identifying the one or more computing devices physically located at the physical banking center location of the financial institution, identifying the one or more functions of the one or more computing devices physically located at the physical banking center location of the financial institution, and instructing the one or more computing devices physically located at the physical banking center location of the financial institution to enable the one or more functions of the one or more computing devices physically located at the physical banking center location of the financial institution for the one or more customers of the customers of the financial institution at the physical banking center location of the financial institution may include generating one or more messages comprising data identifying the computing device associated with the deposit drop box physically located at the physical banking center location of the financial institution, identifying the function configured to prepare the deposit drop box physically located at the physical banking center location of the financial institution to receive the deposit from the customer of the financial institution authorized to make deposits at the physical banking center location of the financial institution via the deposit drop box physically located at the physical banking center location of the financial institution, and instructing the computing device associated with the deposit drop box physically located at the physical banking center location of the financial institution to enable the function configured to prepare the deposit drop box physically located at the physical banking center location of the financial institution to receive the deposit from the customer of the financial institution authorized to make deposits at the physical banking center location of the financial institution via the deposit drop box physically located at the physical banking center location of the financial institution.

In some embodiments, generating the one or more messages comprising the data identifying the computing device associated with the deposit drop box physically located at the physical banking center location of the financial institution, identifying the function configured to prepare the deposit drop box physically located at the physical banking center location of the financial institution to receive the deposit from the customer of the financial institution authorized to make deposits at the physical banking center location of the financial institution via the deposit drop box physically located at the physical banking center location of the financial institution, and instructing the computing device associated with the deposit drop box physically located at the physical banking center location of the financial institution to enable the function configured to prepare the deposit drop box physically located at the physical banking center location of the financial institution to receive the deposit from the customer of the financial institution authorized to make deposits at the physical banking center location of the financial institution via the deposit drop box physically located at the physical banking center location of the financial institution may include generating one or more messages comprising data instructing the computing device associated with the deposit drop box physically located at the physical banking center location of the financial institution to enable a barcode scanner configured to scan a barcode associated with the deposit from the customer of the financial institution authorized to make deposits at the physical banking center location of the financial institution via the deposit drop box physically located at the physical banking center location of the financial institution.

In some embodiments, the one or more computing devices physically located at the physical banking center location of the financial institution may include a computing device associated with an automated teller machine physically located at the physical banking center location of the financial institution. In such embodiments, the one or more customers of the customers of the financial institution at the physical banking center location of the financial institution may include a customer of the financial institution authorized to utilize enhanced features of the automated teller machine physically located at the physical banking center location of the financial institution. The one or more functions of the one or more computing devices physically located at the physical banking center location of the financial institution may include a function configured to prepare the automated teller machine physically located at the physical banking center location of the financial institution to set up a video conference between the customer of the financial institution authorized to utilize the enhanced features of the automated teller machine physically located at the physical banking center location of the financial institution and a representative of the financial institution located at a location geographically distinct from the physical banking center location of the financial institution. Generating the one or more messages comprising the data identifying the one or more computing devices physically located at the physical banking center location of the financial institution, identifying the one or more functions of the one or more computing devices physically located at the physical banking center location of the financial institution, and instructing the one or more computing devices physically located at the physical banking center location of the financial institution to enable the one or more functions of the one or more computing devices physically located at the physical banking center location of the financial institution for the one or more customers of the customers of the financial institution at the physical banking center location of the financial institution may include generating one or more messages comprising data identifying the computing device associated with the automated teller machine physically located at the physical banking center location of the financial institution, identifying the function configured to prepare the automated teller machine physically located at the physical banking center location of the financial institution to set up the video conference between the customer of the financial institution authorized to utilize the enhanced features of the automated teller machine physically located at the physical banking center location of the financial institution and the representative of the financial institution located at the location geographically distinct from the physical banking center location of the financial institution, and instructing the computing device associated with the automated teller machine physically located at the physical banking center location of the financial institution to enable the function configured to prepare the automated teller machine physically located at the physical banking center location of the financial institution to set up the video conference between the customer of the financial institution authorized to utilize the enhanced features of the automated teller machine physically located at the physical banking center location of the financial institution and the representative of the financial institution located at the location geographically distinct from the physical banking center location of the financial institution.

In some embodiments, the one or more computing devices physically located at the physical banking center location of the financial institution may include a computing device associated with an investment management kiosk physically located at the physical banking center location of the financial institution. In such embodiments, the one or more customers of the customers of the financial institution at the physical banking center location of the financial institution may include a customer of the financial institution authorized to utilize features of the investment management kiosk physically located at the physical banking center location of the financial institution. The one or more functions of the one or more computing devices physically located at the physical banking center location of the financial institution may include a function configured to prepare the investment management kiosk physically located at the physical banking center location of the financial institution for utilization by the customer of the financial institution authorized to utilize the features of the investment management kiosk physically located at the physical banking center location of the financial institution. Generating the one or more messages comprising the data identifying the one or more computing devices physically located at the physical banking center location of the financial institution, identifying the one or more functions of the one or more computing devices physically located at the physical banking center location of the financial institution, and instructing the one or more computing devices physically located at the physical banking center location of the financial institution to enable the one or more functions of the one or more computing devices physically located at the physical banking center location of the financial institution for the one or more customers of the customers of the financial institution at the physical banking center location of the financial institution may include generating one or more messages comprising data identifying the computing device associated with the investment management kiosk physically located at the physical banking center location of the financial institution, identifying the function configured to prepare the investment management kiosk physically located at the physical banking center location of the financial institution for utilization by the customer of the financial institution authorized to utilize the features of the investment management kiosk physically located at the physical banking center location of the financial institution, and instructing the computing device associated with the investment management kiosk physically located at the physical banking center location of the financial institution to prepare the investment management kiosk physically located at the physical banking center location of the financial institution for utilization by the customer of the financial institution authorized to utilize the features of the investment management kiosk physically located at the physical banking center location of the financial institution.

In some embodiments, the plurality of messages comprising the data indicating the physical presence of the customers of the financial institution at the physical banking center location of the financial institution may include a plurality of customer identifiers. Each customer identifier of the plurality of customer identifiers may identify a customer of the customers of the financial institution at the physical banking center location of the financial institution.

In some embodiments, the computing platform may receive one or more messages comprising data indicating a plurality of customers of the financial institution that are authorized to utilize one or more functions of one or more computing devices physically located at the physical banking center location of the financial institution. In such embodiments, the computing platform may generate a plurality of records comprising the data indicating the plurality of customers of the financial institution that are authorized to utilize the one or more functions of the one or more computing devices physically located at the physical banking center location of the financial institution, and may store the plurality of records comprising the data indicating the plurality of customers of the financial institution that are authorized to utilize the one or more functions of the one or more computing devices physically located at the physical banking center location of the financial institution in a memory.

In some embodiments, determining that the one or more customers of the customers of the financial institution at the physical banking center location of the financial institution are authorized to utilize the one or more functions of the one or more computing devices physically located at the physical banking center location of the financial institution may include identifying at least one record comprising data associated with a customer identifier of the plurality of customer identifiers from amongst the plurality of records comprising the data indicating the plurality of customers of the financial institution that are authorized to utilize the one or more functions of the one or more computing devices physically located at the physical banking center location of the financial institution.

In some embodiments, the indoor positioning system may include a plurality of personal computing devices presently in possession of the customers of the financial institution at the physical banking center location of the financial institution, and at least one location beacon that is located at the physical banking center location of the financial institution and configured to emit a signal comprising an identifier associated with the physical banking center location. In such embodiments, receiving the plurality of messages comprising the data indicating the physical presence of the customers of the financial institution at the physical banking center location of the financial institution may include receiving data comprising the identifier associated with the physical banking center location from the plurality of personal computing devices.

In some embodiments, the indoor positioning system may include a location beacon that is located at a first location of the physical banking center location of the financial institution and configured to emit a signal comprising an identifier associated with the first location of the physical banking center location of the financial institution, and a location beacon that is located at a second location of the physical banking center location of the financial institution and configured to emit a signal comprising an identifier associated with the second location of the physical banking center location of the financial institution. In such embodiments, receiving the plurality of messages comprising the data indicating the physical presence of the customers of the financial institution at the physical banking center location of the financial institution may include receiving messages comprising data indicating physical presence of a portion of the customers of the financial institution at the first location of the physical banking center location of the financial institution, and receiving messages comprising data indicating physical presence of a portion of the customers of the financial institution at the second location of the physical banking center location of the financial institution.

In some embodiments, determining that the one or more customers of the customers of the financial institution at the physical banking center location of the financial institution are authorized to utilize the one or more functions of the one or more computing devices physically located at the physical banking center location of the financial institution may include determining that a customer of the portion of the customers of the financial institution at the first location of the physical banking center location of the financial institution is authorized to utilize one or more functions of one or more computing devices physically located at the first location of the physical banking center location of the financial institution, and determining that a customer of the portion of the customers of the financial institution at the second location of the physical banking center location of the financial institution is authorized to utilize one or more functions of one or more computing devices physically located at the second location of the physical banking center location of the financial institution.

In some embodiments, the computing platform may determine that at least one of the one or more customers of the customers of the financial institution at the physical banking center location of the financial institution has left the physical banking center location of the financial institution based on at least a portion of the data indicating the physical presence of the customers of the financial institution at the physical banking center location of the financial institution. In such embodiments, responsive to determining that at least one of the one or more customers of the customers of the financial institution at the physical banking center location of the financial institution has left the physical banking center location of the financial institution, the computing platform may generate one or more messages comprising data identifying at least one of the one or more computing devices physically located at the physical banking center location of the financial institution, identifying at least one of the one or more functions of the at least one of the one or more computing devices physically located at the physical banking center location of the financial institution, and instructing the at least one of the one or more computing devices physically located at the physical banking center location of the financial institution to disable the at least one of the one or more functions of the at least one of the one or more computing devices physically located at the physical banking center location of the financial institution for the at least one of the one or more customers of the customers of the financial institution at the physical banking center location of the financial institution. The computing platform may communicate the one or more messages comprising the data identifying the at least one of the one or more computing devices physically located at the physical banking center location of the financial institution, identifying the at least one of the one or more functions of the at least one of the one or more computing devices physically located at the physical banking center location of the financial institution, and instructing the at least one of the one or more computing devices physically located at the physical banking center location of the financial institution to disable the at least one of the one or more functions of the at least one of the one or more computing devices physically located at the physical banking center location of the financial institution for the at least one of the one or more customers of the customers of the financial institution at the physical banking center location of the financial institution.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
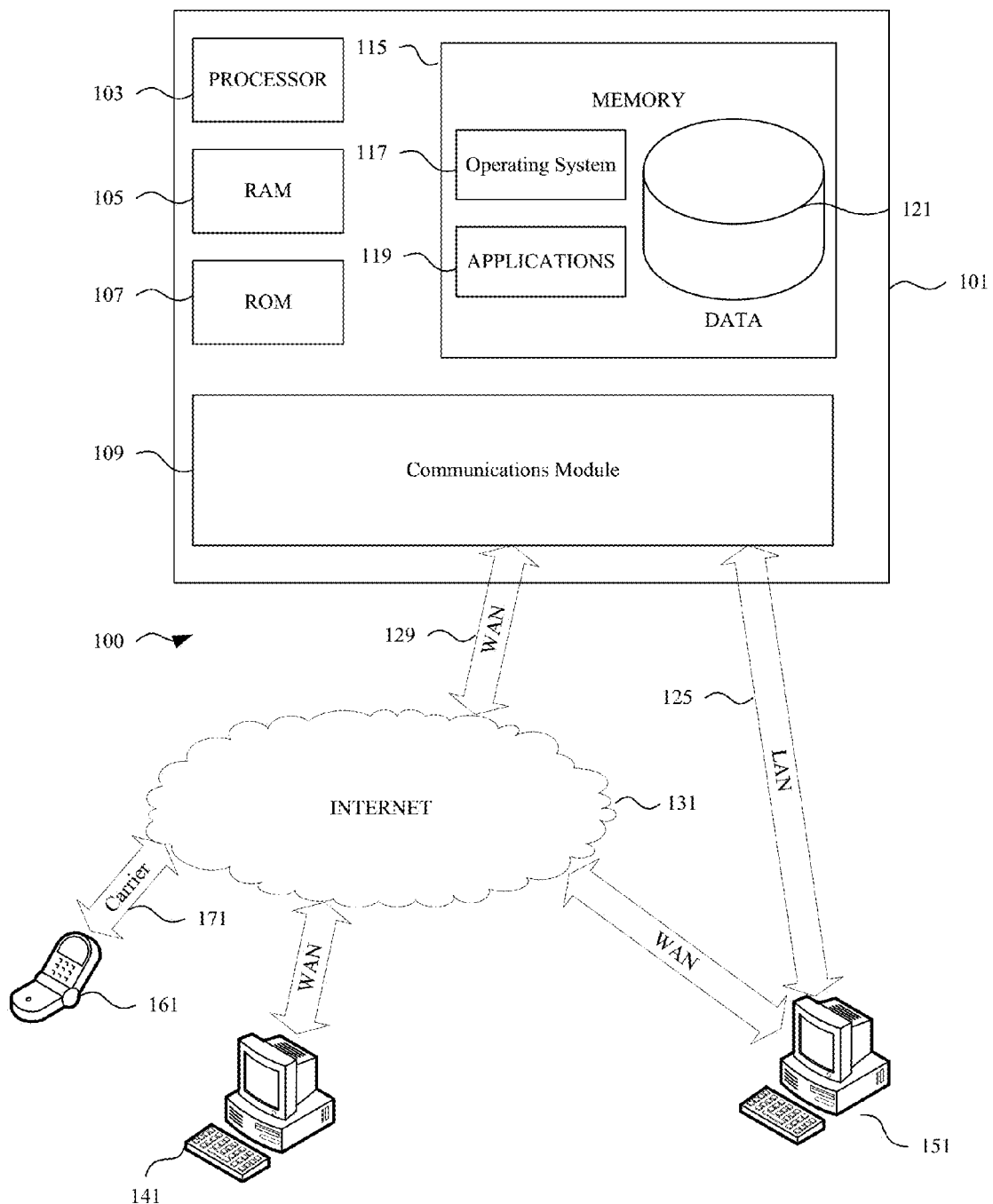
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
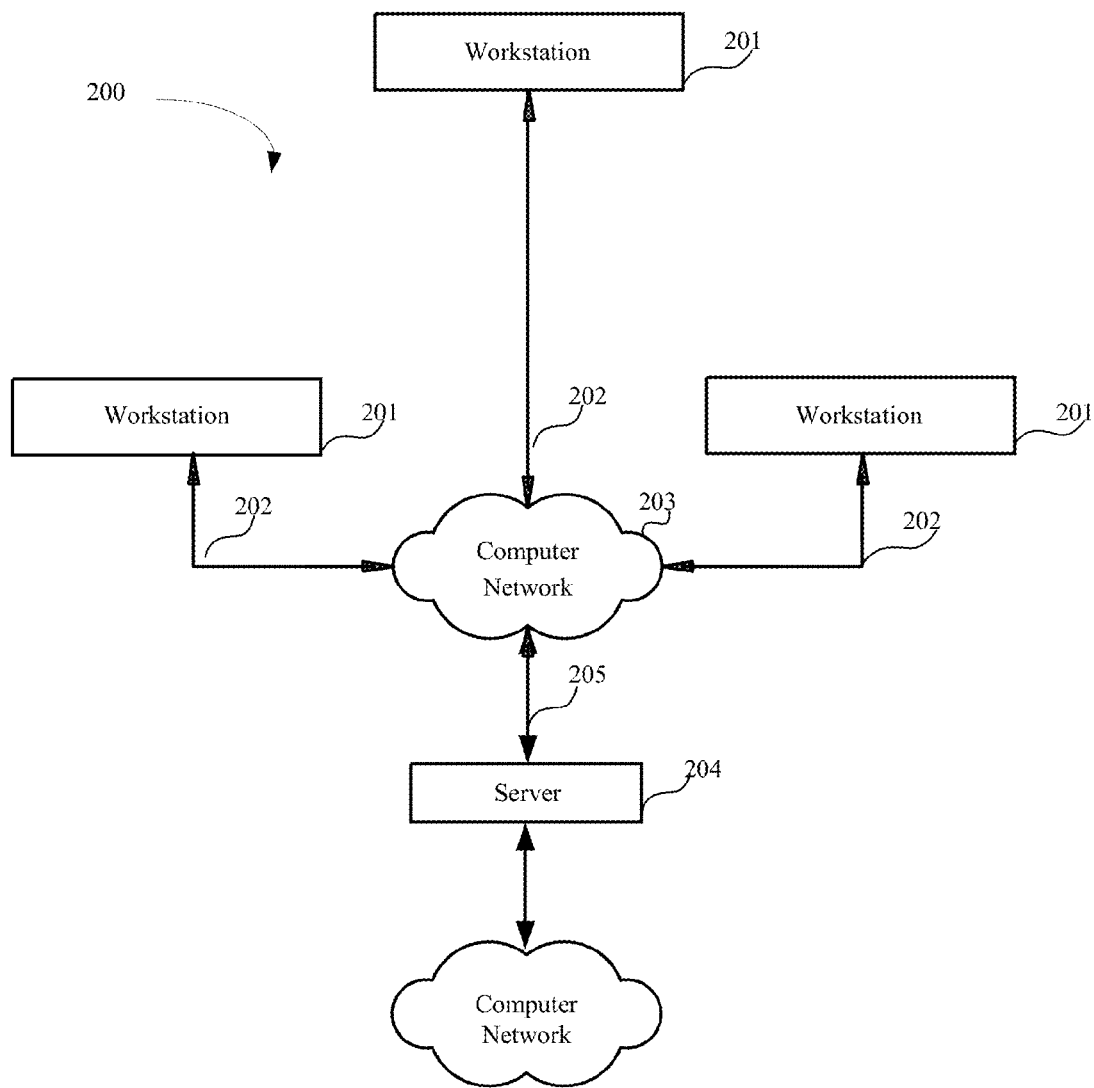
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
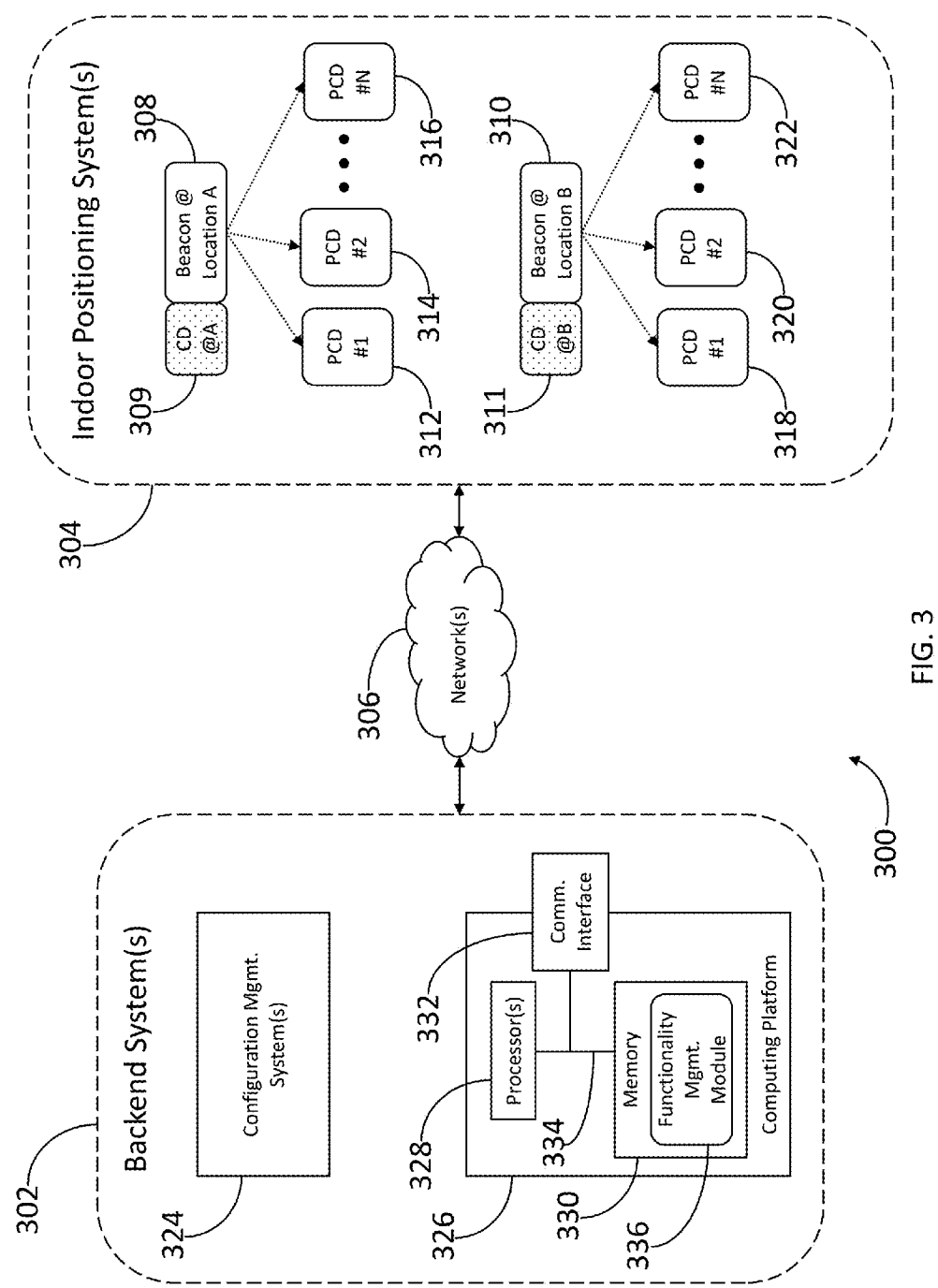
FIG. 3 depicts an illustrative computing environment for enabling device functionality based on indoor positioning system detection of physical customer presence in accordance with one or more example embodiments.

FIG. 3 depicts an illustrative computing environment for enabling device functionality based on indoor positioning system detection of physical customer presence in accordance with one or more example embodiments. Referring to FIG. 3, computing environment 300 may include one or more computing systems. For example, computing environment 300 may include backend computing system(s) 302 and indoor positioning system(s) 304. As will be described in greater detail below, backend computing system(s) 302 and/or indoor positioning system(s) 304 may include one or more computing devices associated with an organization (e.g., a financial institution). Indoor positioning system(s) 304 may be located at a particular physical location associated with the organization (e.g., a physical banking center location of the financial institution). In some embodiments, backend computing system(s) 302 may be located at a different geographic location from indoor positioning system(s) 304 (e.g., a central processing facility associated with the financial institution). Computing environment 300 may also include one or more networks. For example, computing environment 300 may include network(s) 306. Network(s) 306 may interconnect one or more computing devices of backend computing system(s) 302, one or more computing devices of indoor positioning system(s) 304, and/or one or more other computing devices of computing environment 300, and may include one or more sub-networks (e.g., LANs, WANs, or the like).

Indoor positioning system(s) 304 may include one or more location beacons configured to emit or broadcast a signal (e.g., a Bluetooth Low Energy signal, a Bluetooth Smart signal, a low-power radio signal, or the like) comprising an identifier associated with its physical location (e.g., a physical banking center location of the financial institution and/or a location within the physical banking center location of the financial institution). For example, indoor positioning system(s) 304 may include location beacon 308 and location beacon 310. Location beacon 308 may be configured to emit a signal comprising an identifier associated with its physical location (e.g., Location "A"), for example, an identifier associated with the physical banking center location of the financial institution and/or a location within the physical banking center location of the financial institution (e.g., an area associated with one or more human tellers, an area associated with one or more automated teller machines, an area associated with one or more loan officers, an area associated with one or more financial planners, an area associated with one or more customer service professionals, an area associated with an indoor lobby, an area associated with an outdoor lobby, an area associated with a walk-up or drive-up window, or the like). In some embodiments, one or more computing devices may be associated with location beacon 308's physical location (e.g., Location "A"). For example, computing environment 300 may include computing device 309, which may be associated with location beacon 308's physical location (e.g., physically located within a predetermined proximity of location beacon 308 that corresponds to a range of the signal(s) emitted by location beacon 308). Computing device 309 may be any type of computing device (e.g., general purpose computing device, special purpose computing device, server, server blade, mainframe, desktop computer, laptop computer, tablet computer, mobile computing device, smart phone, or the like) capable of enabling and/or disabling one or more functions of itself or another physical device with which it is associated by physical proximity (e.g., a deposit drop box, an automated teller machine, an investment management kiosk, or the like). As the shading of computing device 309 indicates, computing device 309 is illustrated adjacent to location beacon 308 for the purpose of illustrating their relationship (e.g., their physical proximity to one another), but computing device 309 may or may not be part of indoor positioning system(s) 304.

Similarly, location beacon 310 may be configured to emit a signal comprising an identifier associated with its physical location (e.g., Location "B"), for example, an identifier associated with the physical banking center location of the financial institution and/or a different location within the physical banking center location of the financial institution. Indoor positioning system(s) 304 may also include one or more personal computing devices, which may be presently in the possession of individuals (e.g., customers and/or associates of the financial institution) located at indoor positioning system(s) 304's physical location. For example, indoor positioning system(s) 304 may include personal computing devices 312 and 314 through 316, and personal computing devices 318 and 320 through 322. In some embodiments, one or more computing devices may be associated with location beacon 310's physical location (e.g., Location "B"). For example, computing environment 300 may include computing device 311, which may be associated with location beacon 310's physical location (e.g., physically located within a predetermined proximity of location beacon 310 that corresponds to a range of the signal(s) emitted by location beacon 310). Computing device 311 may be any type of computing device (e.g., general purpose computing device, special purpose computing device, server, server blade, mainframe, desktop computer, laptop computer, tablet computer, mobile computing device, smart phone, or the like) capable of enabling and/or disabling one or more functions of itself or another physical device with which it is associated by physical proximity (e.g., a deposit drop box, an automated teller machine, an investment management kiosk, or the like). As the shading of computing device 311 indicates, computing device 311 is illustrated adjacent to location beacon 310 for the purpose of illustrating their relationship (e.g., their physical proximity to one another), but computing device 311 may or may not be part of indoor positioning system(s) 304.

Personal computing devices 312 and 314 through 316, and/or personal computing devices 318 and 320 through 322 may be any type of computing device capable of detecting the signal(s) emitted or broadcast by location beacon 308 and/or location beacon 310, generating a messaging indicating detection of the signal(s), and communicating the message indicating detection of the signal(s) to one or more other computing devices. For example, personal computing devices 312 and 314 through 316, and/or personal computing devices 318 and 320 through 322 may include one or more laptop computers, tablet computers, smart phones, mobile devices, near field communication tags, or the like. As will be described in greater detail below, when located within a proximity (e.g., zero to one hundred meters) of location beacon 308 and/or location beacon 310, personal computing devices 312 and 314 through 316, and/or personal computing devices 318 and 320 through 322 may be configured to detect signal(s) emitted by location beacon 308 and/or location beacon 310. Responsive to detecting signal(s) emitted by location beacon 308 and/or location beacon 310, personal computing devices 312 and 314 through 316, and/or personal computing devices 318 and 320 through 322 may be configured to generate a message indicating detection of the signal(s), and communicate the message to one or more other computing devices (e.g., one or more computing devices of backend computing system(s) 302). As indicated above, the signal(s) emitted by location beacon 308 and/or location beacon 310 may comprise one or more identifiers associated with their respective locations (e.g., Location "A," Location "B," or the like), and the message(s) generated by personal computing devices 312 and 314 through 316, and/or personal computing devices 318 and 320 through 322 responsive to detection of the signal(s) may comprise the identifier(s) and/or information identified utilizing the identifier(s) (e.g., information associated with Location "A," Location "B," or the like). Additionally or alternatively, the message(s) generated by personal computing devices 312 and 314 through 316, and/or personal computing devices 318 and 320 through 322 responsive to detection of the signal(s) may comprise identifiers associated with an individual presently in possession of one or more of personal computing devices 312 and 314 through 316, and/or personal computing devices 318 and 320 through 322, for example, customer identifier(s), associate identifier(s), or the like.

Backend computing system(s) 302 may include one or more computing devices associated with the organization (e.g., the financial institution). For example, backend computing system(s) 302 may include configuration management system(s) 324 and computing platform 326. As will be described in greater detail below, configuration management system(s) 324 may include one or more computing devices (e.g., mainframes, servers, server blades, or the like) configured to maintain information regarding customers of the organization (e.g., whether one or more customers of the organization are authorized to utilize one or more functions of one or more computing devices associated with the organization). Computing platform 326 may include one or more processor(s) 328, memory 330, communication interface 332, and data bus 334. Data bus 334 may interconnect processor(s) 328, memory 330, and/or communication interface 332. Communication interface 332 may be a network interface configured to support communications between computing platform 326 and network(s) 306, or one or more sub-networks thereof. Memory 330 may include one or more program modules comprising instructions that when executed by processor(s) 328 cause computing platform 326 to perform one or more functions described herein. For example, memory 330 may include functionality management module 336, which may comprise instructions that when executed by processor(s) 328 may cause computing platform 326 to perform one or more functions described herein.

Figure 4A:
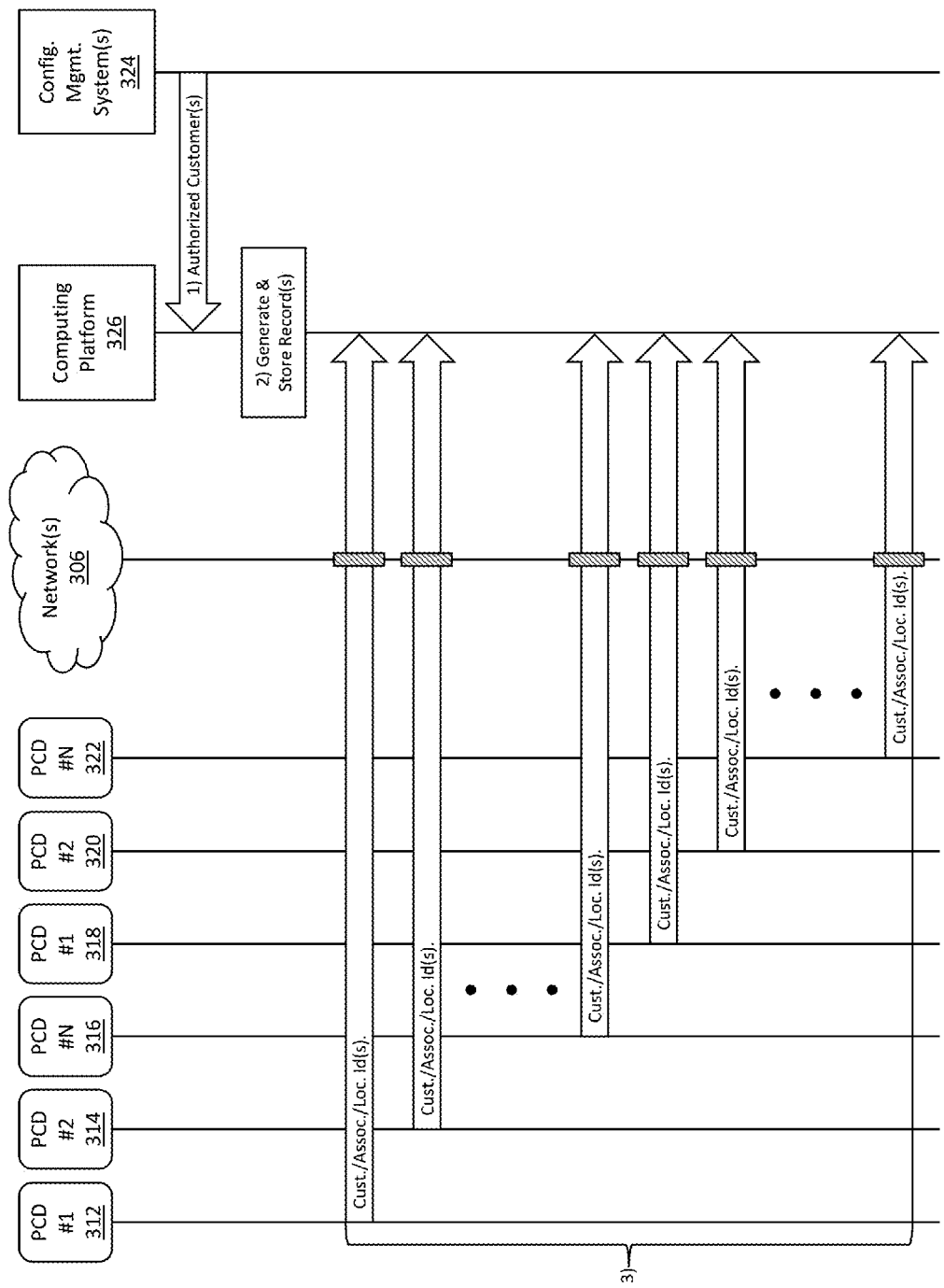
FIGS. 4A, 4B, 4C, 4D, and 4E depict an illustrative event sequence for enabling device functionality based on indoor positioning system detection of physical customer presence in accordance with one or more example embodiments.

FIGS. 4A, 4B, 4C, 4D, and 4E depict an illustrative event sequence for enabling device functionality based on indoor positioning system detection of physical customer presence in accordance with one or more example embodiments. Referring to FIG. 4A, at step 1, one or more computing devices of configuration management system(s) 324 may communicate one or more messages comprising data indicating a plurality of customers of the organization that are authorized to utilize one or more functions of one or more computing devices physically located at one or more locations associated with indoor positioning system(s) 304 to computing platform 326. For example, one or more computing devices of configuration management system(s) 324 may communicate a message comprising data indicating that a customer presently in possession of personal computing device 314 is authorized to utilize one or more functions of computing device 309, and that a customer presently in possession of personal computing device 320 is authorized to utilize one or more functions of computing device 311. Computing platform 326 may receive (e.g., via communication interface 332) the message(s) comprising the data indicating the plurality of customers of the organization that are authorized to utilize the function(s) of the computing device(s) physically located at the location(s) associated with indoor positioning system(s) 304, and, at step 2, may generate one or more records comprising the data indicating the plurality of customers of the organization that are authorized to utilize the function(s) of the computing device(s) physically located at the location(s) associated with indoor positioning system(s) 304, and may store the record(s) comprising the data indicating the plurality of customers of the organization that are authorized to utilize the function(s) of the computing device(s) physically located at the location(s) associated with indoor positioning system(s) 304 in memory 330. For example, computing platform 326 may generate one or more records comprising the data indicating that the customer presently in possession of personal computing device 314 is authorized to utilize the function(s) of computing device 309, and that the customer presently in possession of personal computing device 320 is authorized to utilize the function(s) of computing device 311, and computing platform 326 may store the record(s) comprising the data indicating that the customer presently in possession of personal computing device 314 is authorized to utilize the function(s) of computing device 309, and that the customer presently in possession of personal computing device 320 is authorized to utilize the function(s) of computing device 311 in memory 330.

At step 3, computing platform 326 may receive (e.g., via communication interface 332 and network(s) 306) a plurality of messages comprising data indicating physical presence of individuals associated with an organization (e.g., customers and/or associates of a financial institution) at a physical location of the organization from indoor positioning system(s) 304 (e.g., an indoor positioning system located at a physical banking center location of the financial institution). For example, individuals (e.g., customers and/or associates of the financial institution) presently in possession of personal computing devices 312 and 314 through 316 may be located within a predetermined proximity of location beacon 308 (e.g., at Location "A"), and personal computing devices 312 and 314 through 316 may detect a signal emitted by location beacon 308 comprising an identifier associated with its location, and, responsive to detecting the signal, may generate and communicate to computing platform 326 (e.g., via network(s) 306) one or more messages indicating their physical presence within the proximity of location beacon 308. Similarly, individuals (e.g., customers and/or associates of the financial institution) presently in possession of personal computing devices 318 and 320 through 322 may be located within a predetermined proximity of location beacon 310 (e.g., at Location "B"), and personal computing devices 318 and 320 through 322 may detect a signal emitted by location beacon 310 comprising an identifier associated with its location, and, responsive to detecting the signal, may generate and communicate to computing platform 326 (e.g., via network(s) 306) one or more messages indicating their physical presence within the proximity of location beacon 310.

In some embodiments, each of the plurality of messages may include an identifier associated with the location (e.g., the identifier contained in the signal emitted by location beacon 308 and/or location beacon 310, information identified utilizing the identifier(s), or the like) and/or one or more identifiers associated with an individual (e.g., an associate or customer of the financial institution) presently in possession of the personal computing device that generated the message. For example, a message received from personal computing device 312 may comprise an identifier associated with Location "A" and/or an identifier associated with an individual presently in possession of personal computing device 312 (e.g., at Location "A"). Similarly, a message received from personal computing device 314 may comprise an identifier associated with Location "A" and/or an identifier associated with an individual presently in possession of personal computing device 314 (e.g., at Location "A"); a message received from personal computing device 316 may comprise an identifier associated with Location "A" and/or an identifier associated with an individual presently in possession of personal computing device 316 (e.g., at Location "A"); a message received from personal computing device 318 may comprise an identifier associated with Location "B" and/or an identifier associated with an individual presently in possession of personal computing device 318 (e.g., at Location "B"); a message received from personal computing device 320 may comprise an identifier associated with Location "B" and/or an identifier associated with an individual presently in possession of personal computing device 320 (e.g., at Location "B"); and a message received from personal computing device 322 may comprise an identifier associated with Location "B" and/or an identifier associated with an individual presently in possession of personal computing device 322 (e.g., at Location "B").

Figure 4B:
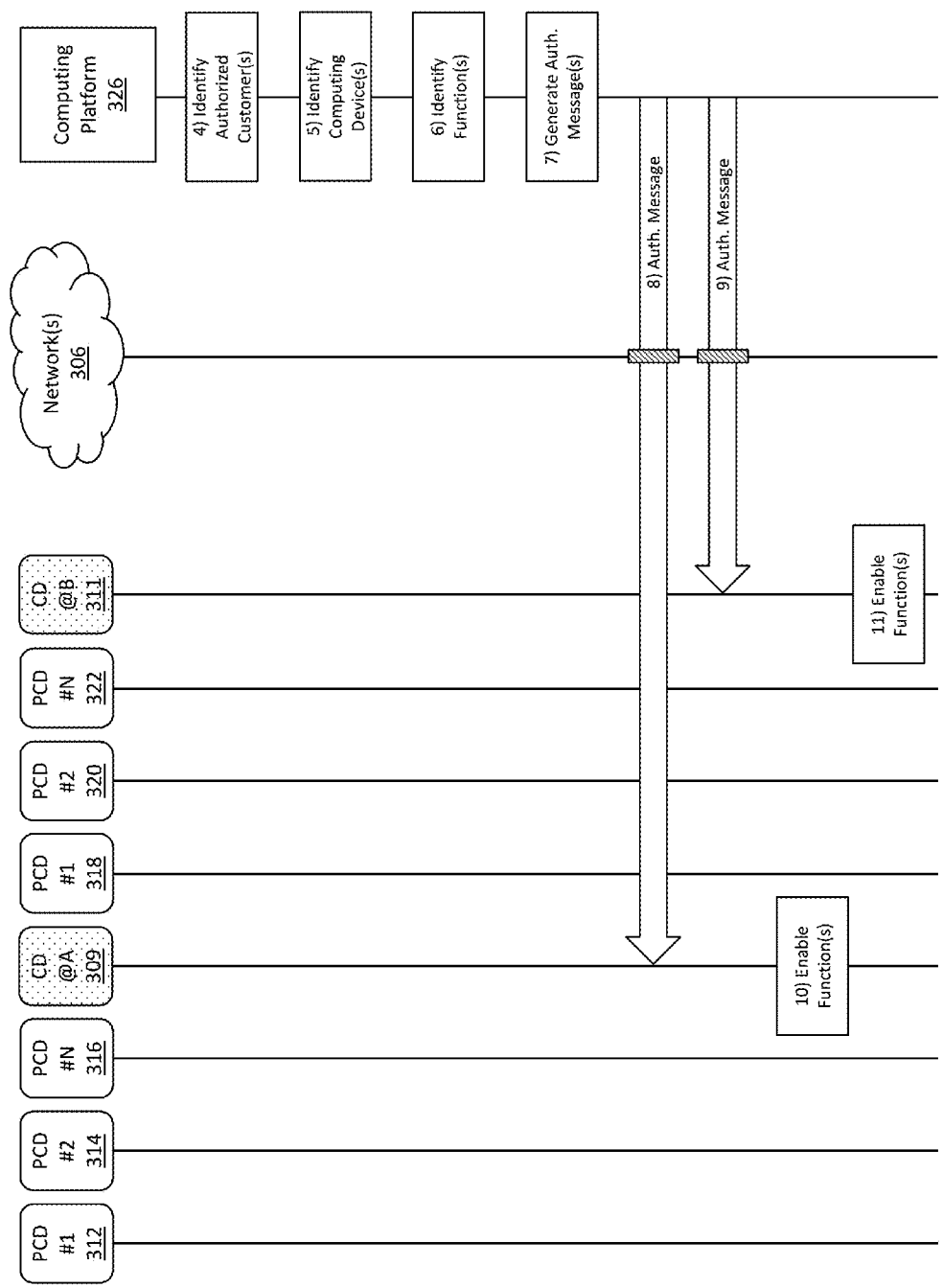

Referring to FIG. 4B, responsive to receiving the plurality of messages comprising the data indicating the physical presence of the customers of the organization at the physical location(s) of the organization associated with indoor positioning system(s) 304 (e.g., Location "A" and/or Location "B"), at step 4, computing platform 326 may identify one or more customers of the customers at the physical location(s) associated with indoor positioning system(s) 304 that are authorized to utilize one or more functions of one or more computing devices physically located at the physical location(s) associated with indoor positioning system(s) 304, and, at step 5, may identify the computing device(s) physically located at the physical location(s) associated with indoor positioning system(s) 304 for which the customers at the physical location(s) associated with indoor positioning system(s) 304 are authorized to use the function(s). For example, as indicated above, the message received from personal computing device 312 may comprise a customer identifier associated with an individual (e.g., a customer) presently in possession of personal computing device 312 (e.g., at Location "A"). Similarly, the message received from personal computing device 314 may comprise a customer identifier associated with an individual (e.g., a customer) presently in possession of personal computing device 314 (e.g., at Location "A"); the message received from personal computing device 318 may comprise a customer identifier associated with an individual (e.g., a customer) presently in possession of personal computing device 318 (e.g., at Location "B"), and the message received from personal computing device 320 may comprise a customer identifier associated with an individual (e.g., a customer) presently in possession of personal computing device 320 (e.g., at Location "B").

In some embodiments, computing platform 326 may determine that the one or more customers of the customers at the physical location(s) associated with indoor positioning system(s) 304 are authorized to utilize one or more functions of one or more computing devices physically located at the physical location(s) associated with indoor positioning system(s) 304, by identifying, from amongst the record(s) comprising the data indicating the customer(s) that are authorized to utilize the function(s) of the computing device(s) physically located at the location(s) associated with indoor positioning system(s) 304 (e.g., the record(s) generated and stored in step 2 above), one or more records comprising data associated with a customer identifier of the customer identifiers received from indoor positioning system(s) 304 (e.g., in step 3 above). For example, computing platform 326 may determine that the individual (e.g., the customer) presently in possession of personal computing device 314 (e.g., at Location "A") is authorized to utilize one or more functions of computing device 309 by identifying, from amongst the record(s) comprising the data indicating the customer(s) that are authorized to utilize the function(s) of the computing device(s) physically located at the location(s) associated with indoor positioning system(s) 304, at least one record comprising data associated with the customer identifier in the message received from personal computing device 314 (e.g., in step 3 above). Similarly, computing platform 326 may determine that the individual (e.g., the customer) presently in possession of personal computing device 320 (e.g., at Location "B") is authorized to utilize one or more functions of computing device 311 by identifying, from amongst the record(s) comprising the data indicating the customer(s) that are authorized to utilize the function(s) of the computing device(s) physically located at the location(s) associated with indoor positioning system(s) 304, at least one record comprising data associated with the customer identifier in the message received from personal computing device 320 (e.g., in step 3 above).

At step 6, computing platform 326 may identify one or more functions of computing device 309 that the customer presently in possession of personal computing device 314 is authorized to utilize (e.g., from the record comprising the data associated with the customer identifier in the message received from personal computing device 314), and one or more functions of computing device 311 that the customer presently in possession of personal computing device 320 is authorized to utilize (e.g., from the record comprising the data associated with the customer identifier in the message received from personal computing device 320). At step 7, computing platform 326 may generate one or more authorization messages instructing the computing device(s) physically located at the location(s) associated with indoor positioning system(s) 304 to enable the function(s) that the customer(s) located at the location(s) associated with indoor positioning system(s) 304 are authorized to utilize. For example, computing platform 326 may generate an authorization message instructing computing device 309 to enable the function(s) that the customer presently in possession of personal computing device 314 is authorized to utilize. Similarly, computing platform 326 may generate an authorization message instructing computing device 311 to enable the function(s) that the customer presently in possession of personal computing device 320 is authorized to utilize. At step 8, computing platform 326 may communicate, to computing device 309 (e.g., via communication interface 332 and network(s) 306), the authorization message instructing computing device 309 to enable the function(s) that the customer presently in possession of personal computing device 314 is authorized to utilize. At step 9, computing platform 326 may communicate, to computing device 311 (e.g., via communication interface 332 and network(s) 306), the authorization message instructing computing device 311 to enable the function(s) that the customer presently in possession of personal computing device 320 is authorized to utilize.

Figure 4C:
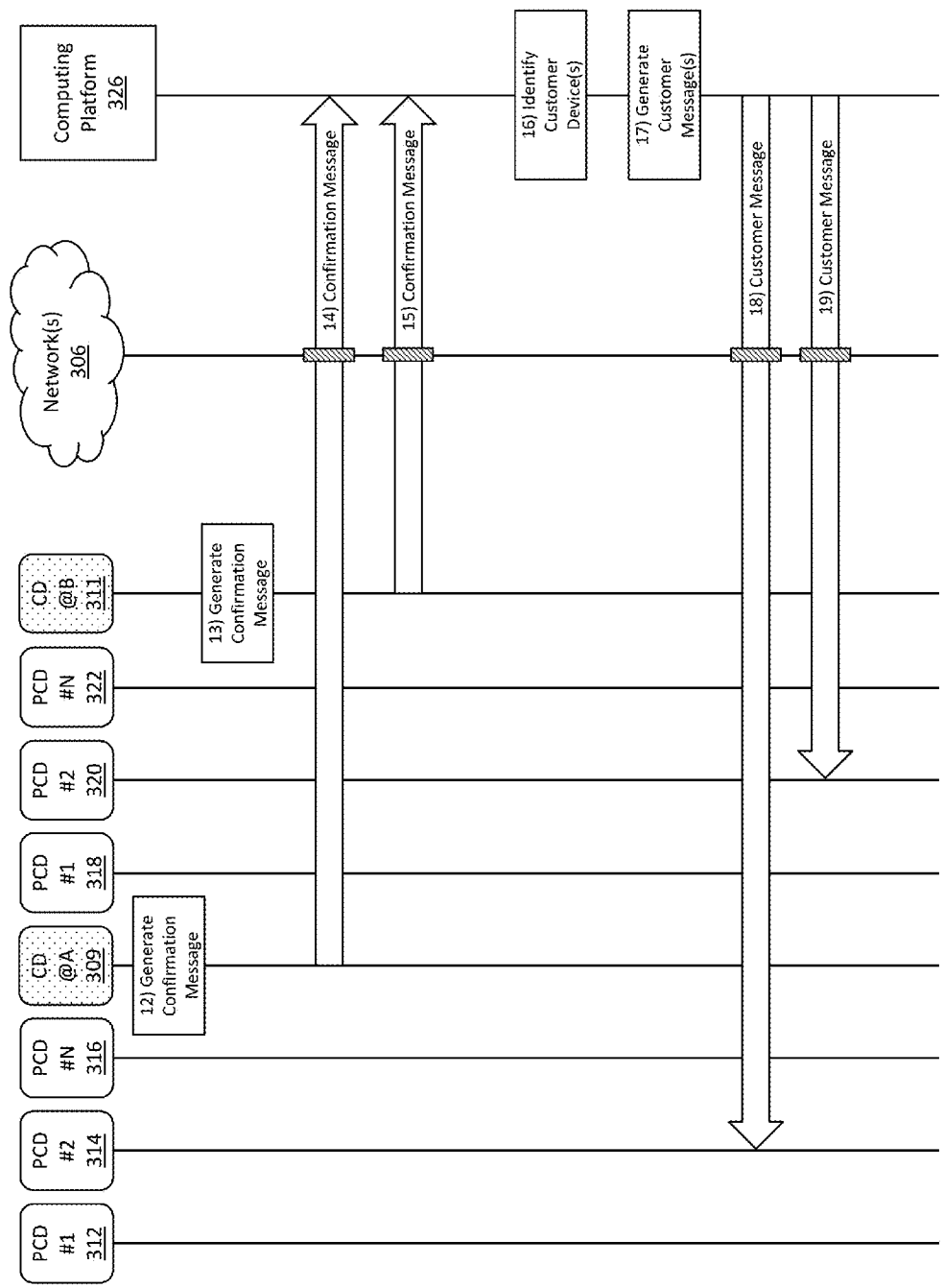

Computing device 309 may receive the authorization message instructing it to enable the function(s) that the customer presently in possession of personal computing device 314 is authorized to utilize, and, at step 10, may enable the function(s) that the customer presently in possession of personal computing device 314 is authorized to utilize. Computing device 311 may receive the authorization message instructing it to enable the function(s) that the customer presently in possession of personal computing device 320 is authorized to utilize, and, at step 11, may enable the function(s) that the customer presently in possession of personal computing device 320 is authorized to utilize. Referring to FIG. 4C, at step 12, computing device 309 may generate a message confirming that the function(s) that the customer presently in possession of personal computing device 314 is authorized to utilize have been enabled. At step 13, computing device 311 may generate a message confirming that the function(s) that the customer presently in possession of personal computing device 320 is authorized to utilize have been enabled. At step 14, computing device 309 may communicate (e.g., via network(s) 306) the message confirming that the function(s) that the customer presently in possession of personal computing device 314 is authorized to utilize have been enabled to computing platform 326, which may receive the message confirming that the function(s) that the customer presently in possession of personal computing device 314 is authorized to utilize have been enabled (e.g., via communication interface 332). At step 15, computing device 311 may communicate (e.g., via network(s) 306) the message confirming that the function(s) that the customer presently in possession of personal computing device 320 is authorized to utilize have been enabled to computing platform 326, which may receive the message confirming that the function(s) that the customer presently in possession of personal computing device 320 is authorized to utilize have been enabled (e.g., via communication interface 332).

Figure 5:
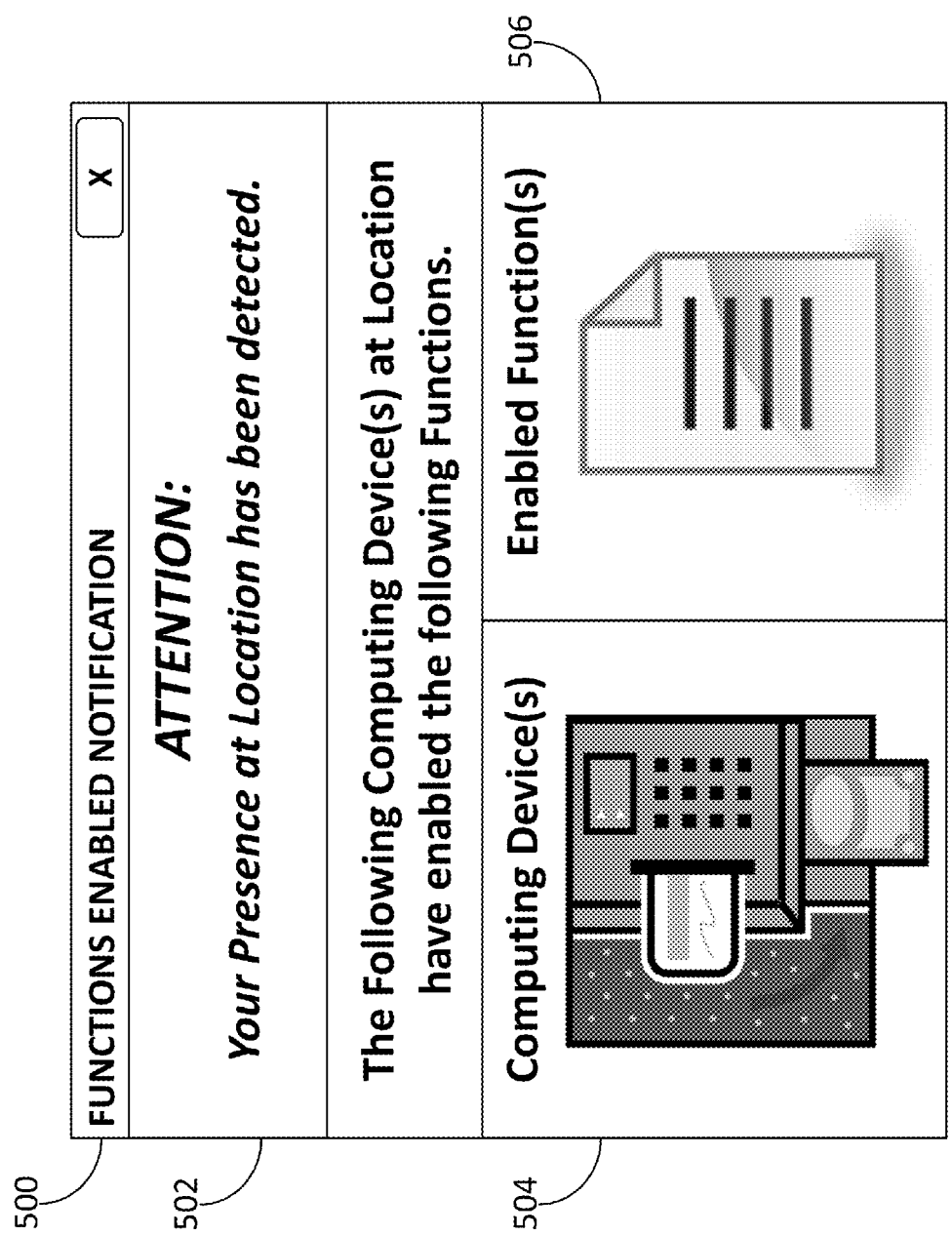
FIG. 5 depicts an example customer message for enabling device functionality based on indoor positioning system detection of physical customer presence in accordance with one or more example embodiments.

At step 16, computing platform 326 may identify personal computing device 314 (e.g., based on the message received from personal computing device 314 in step 3 above), and personal computing device 320 (e.g., based on the message received from personal computing device 320 in step 3 above). At step 17, computing platform 326 may generate one or more customer messages indicating that the function(s) of the computing device(s) located at the location(s) associated with indoor positioning system(s) 304 that the customers located at the location(s) associated with indoor positioning system(s) 304 are authorized to utilize have been enabled. For example, computing platform 326 may generate a customer message indicating that the function(s) of computing device 309 that the customer presently in possession of personal computing device 314 is authorized to utilize have been enabled. Similarly, computing platform 326 may generate a customer message indicating that the function(s) of computing device 311 that the customer presently in possession of personal computing device 320 is authorized to utilize have been enabled. FIG. 5 depicts an example customer message for enabling device functionality based on indoor positioning system detection of physical customer presence in accordance with one or more example embodiments. Referring to FIG. 5, message 500 may include section 502, indicating that the customer's physical presence at the location(s) associated with indoor positioning system(s) 304 has been detected. Message 500 may also include section 504, which may identify one or more computing devices physically located at the location(s) associated with indoor positioning system(s) 304 that the customer is authorized to utilize. Message 500 may further include section 506, which may identify one or more functions of the computing device(s) located at the location(s) associated with indoor positioning system(s) 304 that the customer is authorized to utilize.

Figure 4D:
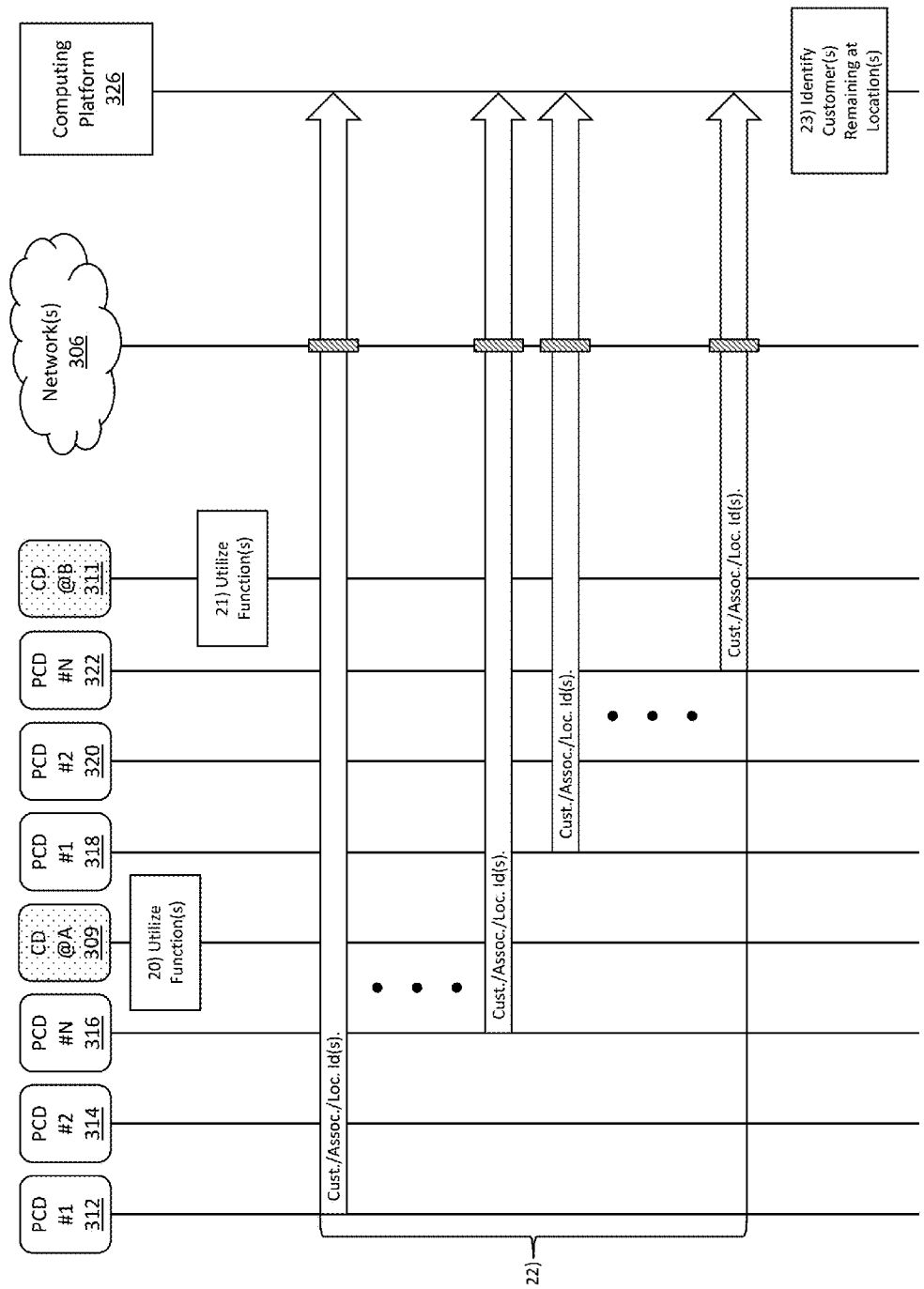

Returning to FIG. 4C, at step 18, computing platform 326 may communicate (e.g., via communication interface 332 and network(s) 306) the customer message indicating that the function(s) of computing device 309 that the customer presently in possession of personal computing device 314 is authorized to utilize have been enabled to personal computing device 314. At step 19, computing platform 326 may communicate (e.g., via communication interface 332 and network(s) 306) the customer message indicating that the function(s) of computing device 311 that the customer presently in possession of personal computing device 320 is authorized to utilize have been enabled to personal computing device 320. Referring to FIG. 4D, at step 20, the customer presently in possession of personal computing device 314 may utilize the enabled function(s) of computing device 309. For example, in the context of a financial institution, computing device 309 may be associated with a deposit drop box physically located at Location "A," the customer presently in possession of personal computing device 314 may be a customer authorized to make deposits via the deposit drop box, and the enabled function(s) may include a function configured to prepare (e.g., by enabling a barcode scanner configured to scan a barcode associated with the deposit) the deposit drop box to receive a deposit from the customer presently in possession of personal computing device 314, for example, as the customer presently in possession of personal computing device 314 approaches the deposit drop box (e.g., arrives at Location "A"), which may reduce the time required to complete the deposit. Additionally or alternatively, computing device 309 may be associated with an automated teller machine physically located at Location "A," the customer presently in possession of personal computing device 314 may be a customer authorized to utilize one or more enhanced features of the automated teller machine, and the enabled function(s) may include a function configured to set up a video conference between the customer presently in possession of personal computing device 314 and a representative located a different geographic location from Location "A," for example, as the customer presently in possession of personal computing device 314 approaches the automated teller machine (e.g., arrives at Location "A"), which may reduce the time the customer presently in possession of personal computing device 314 has to wait before interacting with the representative via the video conference. At step 21, the customer presently in possession of personal computing device 320 may utilize the enabled function(s) of computing device 311. For example, in the context of a financial institution, computing device 311 may be associated with an investment management kiosk physically located at Location "B," the customer presently in possession of personal computing device 320 may be a customer authorized to utilize features of the investment management kiosk, and the enabled function(s) may include a function configured to prepare (e.g., by identifying and locally caching one or more files associated with the customer presently in possession of personal computing device 320) the investment management kiosk for utilization by the customer presently in possession of personal computing device 320, for example, as the customer presently in possession of personal computing device 320 approaches the investment management kiosk (e.g., arrives at Location "B"), which may reduce the time required to complete one or more investment transactions, or the like.

At step 22, computing platform 326 may receive (e.g., via communication interface 332 and network(s) 306) a plurality of messages comprising data indicating that a subset of the customers at the physical location(s) associated with indoor positioning system(s) 304 remain physically present at the physical location(s) associated with indoor positioning system(s) 304 from indoor positioning system(s) 304. For example, computing platform 326 may receive (e.g., via communication interface 332 and network(s) 306) a message from personal computing device 312, indicating that the customer presently in possession of personal computing device 312 remains physically present at Location "A," and a message from personal computing device 318, indicating that the customer presently in possession of personal computing device 318 remains physically present at Location "B." At step 23, computing platform 326 may identify one or more customers among the subset of the customers at the physical location(s) associated with indoor positioning system(s) 304 that remain physically present at the physical location(s) associated with indoor positioning system(s) 304. For example, personal computing device 312 may remain presently in possession of a customer physically located at Location "A," the message received from personal computing device 312 (e.g., in step 22 above) may include the identifier associated with the customer that remains presently in possession of personal computing device 312 at Location "A," and computing platform 326 may identify the customer that remains presently in possession of personal computing device 312 at Location "A" based on the identifier associated with the customer that remains presently in possession of personal computing device 312 at Location "A." Similarly, personal computing device 318 may remain presently in possession of a customer physically located at Location "B," the message received from personal computing device 318 (e.g., in step 22 above) may include the identifier associated with the customer that remains presently in possession of personal computing device 318 at Location "B," and computing platform 326 may identify the customer that remains presently in possession of personal computing device 318 at Location "B" based on the identifier associated with the customer that remains presently in possession of personal computing device 318 at Location "B."

Figure 4E:
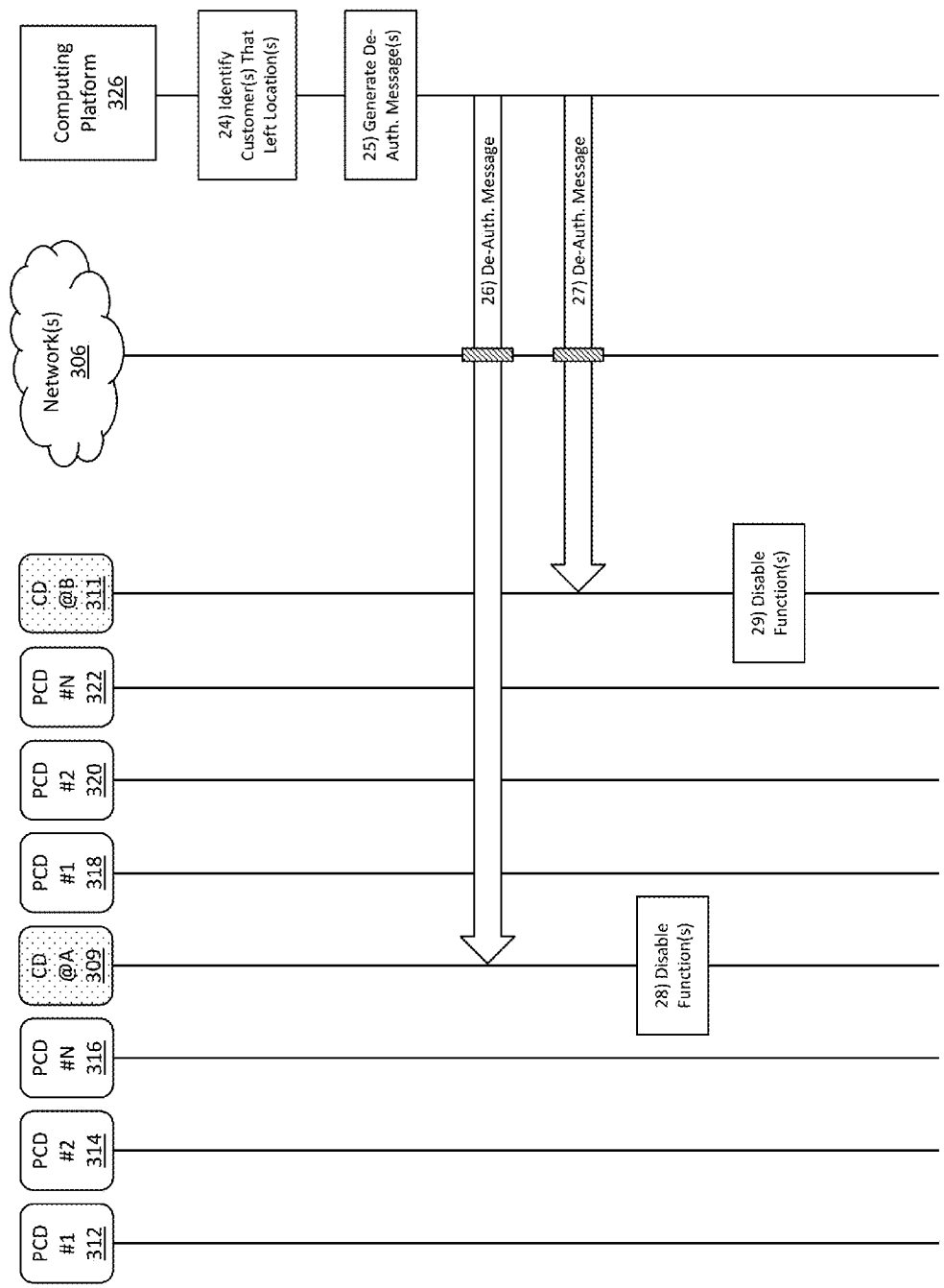

Referring to FIG. 4E, at step 24, computing platform 326 may identify one or more customers that have left the location(s) associated with indoor positioning system(s) 304 (e.g., between a time period in which the messages received in step 3 were received and a time period in which the messages received in step 22 were received). For example, computing platform 326 may determine that the customer presently in possession of personal computing device 314 and the customer presently in possession of personal computing device 320 have left Location "A" and Location "B," respectively, by, for example, determining that the identifier associated with the customer presently in possession of personal computing device 314 (e.g., the identifier received in the message from personal computing device 314 in step 3 above) and the identifier associated with the customer presently in possession of personal computing device 320 (e.g., the identifier received in the message from personal computing device 320 in step 3 above) are not among one or more customer identifiers included in the plurality of messages comprising the data indicating that the subset of the customers at the physical location(s) associated with indoor positioning system(s) 304 remain physically present at the physical location(s) associated with indoor positioning system(s) 304 (e.g., the messages received from indoor positioning system(s) 304 in step 22 above).

Responsive to determining that the customer presently in possession of personal computing device 314 has left Location "A" and that the customer presently in possession of personal computing device 320 has left Location "B," at step 25, computing platform 326 may generate one or more de-authorization messages. For example, computing platform 326 may generate a de-authorization message instructing computing device 309 to disable the function(s) that the customer presently in possession of personal computing device 314 is authorized to utilize. Similarly, computing platform 326 may generate a de-authorization message instructing computing device 311 to disable the function(s) that the customer presently in possession of personal computing device 320 is authorized to utilize. At step 26, computing platform 326 may communicate, to computing device 309 (e.g., via communication interface 332 and network(s) 306), the de-authorization message instructing computing device 309 to disable the function(s) that the customer presently in possession of personal computing device 314 is authorized to utilize. At step 27, computing platform 326 may communicate, to computing device 311 (e.g., via communication interface 332 and network(s) 306), the de-authorization message instructing computing device 311 to disable the function(s) that the customer presently in possession of personal computing device 320 is authorized to utilize. Computing device 309 may receive the de-authorization message instructing it to disable the function(s) that the customer presently in possession of personal computing device 314 is authorized to utilize, and, at step 28, may disable the function(s) that the customer presently in possession of personal computing device 314 is authorized to utilize. Computing device 311 may receive the de-authorization message instructing it to disable the function(s) that the customer presently in possession of personal computing device 320 is authorized to utilize, and, at step 29, may disable the function(s) that the customer presently in possession of personal computing device 320 is authorized to utilize.

Figure 6:
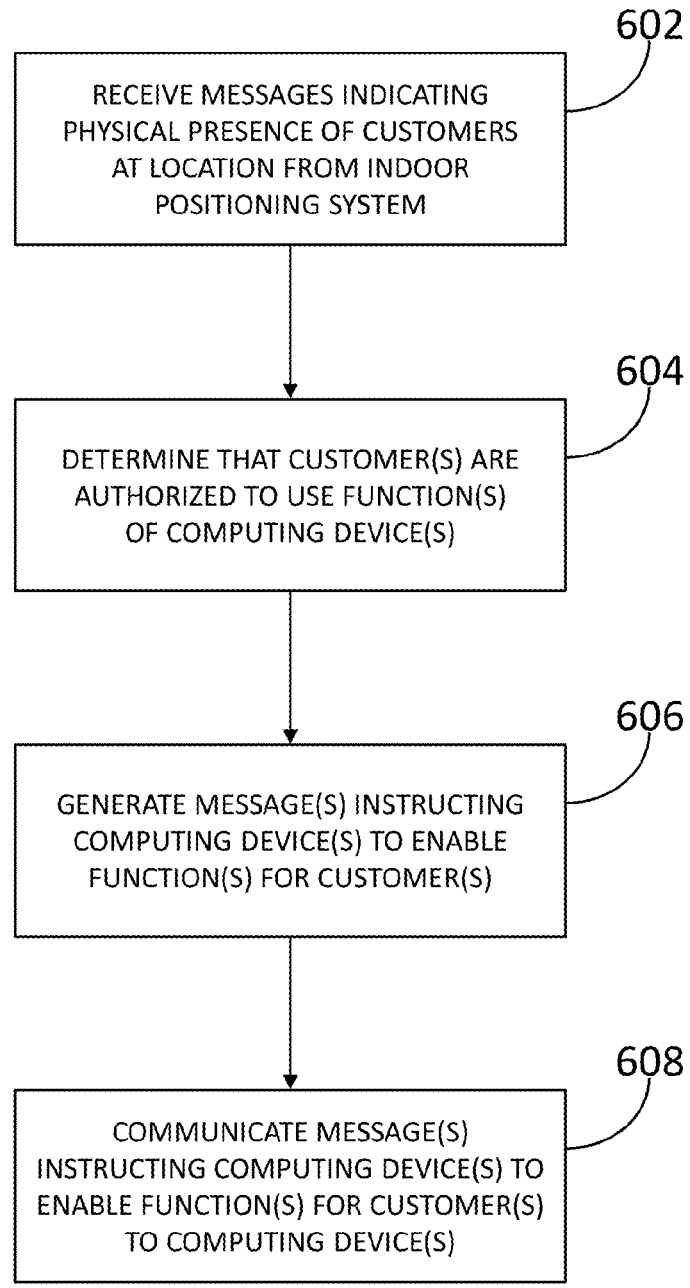
FIG. 6 depicts an illustrative method for enabling device functionality based on indoor positioning system detection of physical customer presence in accordance with one or more example embodiments.

FIG. 6 depicts an illustrative method for enabling device functionality based on indoor positioning system detection of physical customer presence in accordance with one or more example embodiments. Referring to FIG. 6, at step 602, a computing platform may receive a plurality of messages comprising data indicating physical presence of customers at a physical location from an indoor positioning system located at the physical location. For example, computing platform 326 may receive a plurality of messages indicating physical presence of the customer presently in possession of personal computing device 312 at Location "A," the customer presently in possession of personal computing device 314 at Location "A," the customer presently in possession of personal computing device 318 at Location "B," and the customer presently in possession of personal computing device 320 at Location "B," from indoor positioning system(s) 304. At step 604, the computing platform may determine that one or more customers of the customers at the physical location are authorized to utilize one or more functions of one or more computing devices physically located at the physical location. For example, computing platform 326 may determine that the customer presently in possession of personal computing device 314 is authorized to utilize one or more functions of computing device 309, and/or that the customer presently in possession of personal computing device 320 is authorized to utilize one or more functions of computing device 311. At step 606, the computing platform may generate one or more messages comprising data instructing the one or more computing devices physically located at the physical location to enable the one or more functions of the one or more computing devices physically located at the physical location for the one or more customers at the physical location. For example, computing platform 326 may generate a message comprising data instructing computing device 309 to enable the function(s) of computing device 309 that the customer presently in possession of personal computing device 314 is authorized to utilize, and/or a message comprising data instructing computing device 311 to enable the function(s) of computing device 311 that the customer presently in possession of personal computing device 320 is authorized to utilize. At step 608, the computing platform may communicate the one or more messages comprising the data instructing the one or more computing devices physically located at the physical location to enable the one or more functions of the one or more computing devices physically located at the physical location for the one or more customers at the physical location to the one or more computing devices physically located at the physical location. For example, computing platform 326 may communicate the message comprising the data instructing computing device 309 to enable the function(s) of computing device 309 that the customer presently in possession of personal computing device 314 is authorized to utilize to computing device 309, and/or the message comprising the data instructing computing device 311 to enable the function(s) of computing device 311 that the customer presently in possession of personal computing device 320 is authorized to utilize to computing device 311.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
   at a computing platform comprising at least one processor, a memory, and a communication interface:
   receiving, via the communication interface and from an indoor positioning system located at a physical banking center location of a financial institution, a plurality of messages comprising data indicating physical presence of customers of the financial institution at the physical banking center location of the financial institution;
   responsive to receiving the plurality of messages comprising the data indicating the physical presence of the customers of the financial institution at the physical banking center location of the financial institution, determining, by the at least one processor, that one or more customers of the customers of the financial institution at the physical banking center location of the financial institution are authorized to utilize one or more functions of one or more computing devices physically located at the physical banking center location of the financial institution; and
   communicating via the communication interface to one or more personal computing devices in possession of the one or more customers of the financial institution at the physical banking center location of the financial institution, displaying on the one or more personal computing devices that of the one or more computing devices physically located at the physical banking center location of the financial institution that the one or more customers is authorized to use, and the identity of the one or more functions of the one or more the financial institution that the one or more customers is authorized to use.

2. The method of claim 1, comprising, responsive to determining that the one or more customers of the customers of the financial institution at the physical banking center location of the financial institution are authorized to utilize the one or more functions of the one or more computing devices physically located at the physical banking center location of the financial institution identifying, by the at least one processor and based on at least a portion of the data indicating the physical presence of the customers of the financial institution at the physical banking center location of the financial institution, the one or more computing devices physically located at the physical banking center location of the financial institution and the one or more functions of the one or more computing devices physically located at the physical banking center location of the financial institution.

3. The method of claim 1, wherein the plurality of messages comprising the data indicating the physical presence of the customers of the financial institution at the physical banking center location of the financial institution comprises a plurality of customer identifiers, each customer identifier of the plurality of customer identifiers identifying a customer of the customers of the financial institution at the physical banking center location of the financial institution.

4. The method of claim 1, wherein the indoor positioning system comprises a plurality of personal computing devices presently in possession of the customers of the financial institution at the physical banking center location of the financial institution, and at least one location beacon that is located at the physical banking center location of the financial institution and configured to emit a signal comprising an identifier associated with the physical banking center location, and wherein receiving the plurality of messages comprising the data indicating the physical presence of the customers of the financial institution at the physical banking center location of the financial institution comprises receiving, from the plurality of personal computing devices, data comprising the identifier associated with the physical banking center location.

5. The method of claim 2, comprising generating, by the at least one processor, one or more messages comprising data identifying the one or more computing devices physically located at the physical banking center location of the financial institution, identifying the one or more functions of the one or more computing devices physically located at the physical banking center location of the financial institution, and instructing the one or more computing devices physically located at the physical banking center location of the financial institution to enable the one or more functions of the one or more computing devices physically located at the physical banking center location of the financial institution for the one or more customers of the customers of the financial institution at the physical banking center location of the financial institution.

6. The method of claim 3, comprising:
  receiving, via the communication interface and from a configuration management system of the financial institution, one or more messages comprising data indicating a plurality of customers of the financial institution that are authorized to utilize one or more functions of one or more computing devices physically located at the physical banking center location of the financial institution;
  generating, by the at least one processor, a plurality of records comprising the data indicating the plurality of customers of the financial institution that are authorized to utilize the one or more functions of the one or more computing devices physically located at the physical banking center location of the financial institution; and
  storing, by the at least one processor and in the memory, the plurality of records comprising the data indicating the plurality of customers of the financial institution that are authorized to utilize the one or more functions of the one or more computing devices physically located at the physical banking center location of the financial institution.

7. The method of claim 4, wherein the indoor positioning system comprises a location beacon that is located at a first location of the physical banking center location of the financial institution and configured to emit a signal comprising an identifier associated with the first location of the physical banking center location of the financial institution, and a location beacon that is located at a second location of the physical banking center location of the financial institution and configured to emit a signal comprising an identifier associated with the second location of the physical banking center location of the financial institution, and wherein receiving the plurality of messages comprising the data indicating the physical presence of the customers of the financial institution at the physical banking center location of the financial institution comprises:
  receiving messages comprising data indicating physical presence of a portion of the customers of the financial institution at the first location of the physical banking center location of the financial institution; and
  receiving messages comprising data indicating physical presence of a portion of the customers of the financial institution at the second location of the physical banking center location of the financial institution.

8. The method of claim 5, comprising communicating, via the communication interface and to the one or more computing devices physically located at the physical banking center location of the financial institution, the one or more messages comprising the data identifying the one or more computing devices physically located at the physical banking center location of the financial institution, identifying the one or more functions of the one or more computing devices physically located at the physical banking center location of the financial institution, and instructing the one or more computing devices physically located at the physical banking center location of the financial institution to enable the one or more functions of the one or more computing devices physically located at the physical banking center location of the financial institution for the one or more customers of the customers of the financial institution at the physical banking center location of the financial institution.

9. The method of claim 5, wherein:
  the one or more computing devices physically located at the physical banking center location of the financial institution comprise a computing device associated with a deposit drop box physically located at the physical banking center location of the financial institution;
  the one or more customers of the customers of the financial institution at the physical banking center location of the financial institution comprise a customer of the financial institution authorized to make deposits at the physical banking center location of the financial institution via the deposit drop box physically located at the physical banking center location of the financial institution;
  the one or more functions of the one or more computing devices physically located at the physical banking center location of the financial institution comprise a function configured to prepare the deposit drop box physically located at the physical banking center location of the financial institution to receive a deposit from the customer of the financial institution authorized to make deposits at the physical banking center location of the financial institution via the deposit drop box physically located at the physical banking center location of the financial institution; and generating the one or more messages comprising the data identifying the one or more computing devices physically located at the physical banking center location of the financial institution, identifying the one or more functions of the one or more computing devices physically located at the physical banking center location of the financial institution, and instructing the one or more computing devices physically located at the physical banking center location of the financial institution to enable the one or more functions of the one or more computing devices physically located at the physical banking center location of the financial institution for the one or more customers of the customers of the financial institution at the physical banking center location of the financial institution comprises generating one or more messages comprising data identifying the computing device associated with the deposit drop box physically located at the physical banking center location of the financial institution, identifying the function configured to prepare the deposit drop box physically located at the physical banking center location of the financial institution to receive the deposit from the customer of the financial institution authorized to make deposits at the physical banking center location of the financial institution via the deposit drop box physically located at the physical banking center location of the financial institution, and instructing the computing device associated with the deposit drop box physically located at the physical banking center location of the financial institution to enable the function configured to prepare the deposit drop box physically located at the physical banking center location of the financial institution to receive the deposit from the customer of the financial institution authorized to make deposits at the physical banking center location of the financial institution via the deposit drop box physically located at the physical banking center location of the financial institution.

10. The method of claim 5, wherein:

the one or more computing devices physically located at the physical banking center location of the financial institution comprise a computing device associated with an automated teller machine physically located at the physical banking center location of the financial institution;

the one or more customers of the customers of the financial institution at the physical banking center location of the financial institution comprise a customer of the financial institution authorized to utilize enhanced features of the automated teller machine physically located at the physical banking center location of the financial institution;

the one or more functions of the one or more computing devices physically located at the physical banking center location of the financial institution comprise a function configured to prepare the automated teller machine physically located at the physical banking center location of the financial institution to set up a video conference between the customer of the financial institution authorized to utilize the enhanced features of the automated teller machine physically located at the physical banking center location of the financial institution and a representative of the financial institution located at a location geographically distinct from the physical banking center location of the financial institution; and generating the one or more messages comprising the data identifying the one or more computing devices physically located at the physical banking center location of the financial institution, identifying the one or more functions of the one or more computing devices physically located at the physical banking center location of the financial institution, and instructing the one or more computing devices physically located at the physical banking center location of the financial institution to enable the one or more functions of the one or more computing devices physically located at the physical banking center location of the financial institution for the one or more customers of the customers of the financial institution at the physical banking center location of the financial institution comprises generating one or more messages comprising data identifying the computing device associated with the automated teller machine physically located at the physical banking center location of the financial institution, identifying the function configured to prepare the automated teller machine physically located at the physical banking center location of the financial institution to set up the video conference between the customer of the financial institution authorized to utilize the enhanced features of the automated teller machine physically located at the physical banking center location of the financial institution and the representative of the financial institution located at the location geographically distinct from the physical banking center location of the financial institution, and instructing the computing device associated with the automated teller machine physically located at the physical banking center location of the financial institution to enable the function configured to prepare the automated teller machine physically located at the physical banking center location of the financial institution to set up the video conference between the customer of the financial institution authorized to utilize the enhanced features of the automated teller machine physically located at the physical banking center location of the financial institution and the representative of the financial institution located at the location geographically distinct from the physical banking center location of the financial institution.

11. The method of claim 5, wherein:

the one or more computing devices physically located at the physical banking center location of the financial institution comprise a computing device associated with an investment management kiosk physically located at the physical banking center location of the financial institution;

the one or more customers of the customers of the financial institution at the physical banking center location of the financial institution comprise a customer of the financial institution authorized to utilize features of the investment management kiosk physically located at the physical banking center location of the financial institution;

the one or more functions of the one or more computing devices physically located at the physical banking center location of the financial institution comprise a function configured to prepare the investment management kiosk physically located at the physical banking center location of the financial institution for utilization by the customer of the financial institution authorized to utilize the features of the investment management kiosk physically located at the physical banking center location of the financial institution; and generating the one or more messages comprising the data identifying the one or more computing devices physically located at the physical banking center location of the financial institution, identifying the one or more functions of the one or more computing devices physically located at the physical banking center location of the financial institution, and instructing the one or more computing devices physically located at the physical banking center location of the financial institution to enable the one or more functions of the one or more computing devices physically located at the physical banking center location of the financial institution for the one or more customers of the customers of the financial institution at the physical banking center location of the financial institution comprises generating one or more messages comprising data identifying the computing device associated with the investment management kiosk physically located at the physical banking center location of the financial institution, identifying the function configured to prepare the investment management kiosk physically located at the physical banking center location of the financial institution for utilization by the customer of the financial institution authorized to utilize the features of the investment management kiosk physically located at the physical banking center location of the financial institution, and instructing the computing device associated with the investment management kiosk physically located at the physical banking center location of the financial institution to prepare the investment management kiosk physically located at the physical banking center location of the financial institution for utilization by the customer of the financial institution authorized to utilize the features of the investment management kiosk physically located at the physical banking center location of the financial institution.

12. The method of claim 6, wherein determining that the one or more customers of the customers of the financial institution at the physical banking center location of the financial institution are authorized to utilize the one or more functions of the one or more computing devices physically located at the physical banking center location of the financial institution comprises identifying, by the at least one processor and from amongst the plurality of records comprising the data indicating the plurality of customers of the financial institution that are authorized to utilize the one or more functions of the one or more computing devices physically located at the physical banking center location of the financial institution, at least one record comprising data associated with a customer identifier of the plurality of customer identifiers.

13. The method of claim 7, wherein determining that the one or more customers of the customers of the financial institution at the physical banking center location of the financial institution are authorized to utilize the one or more functions of the one or more computing devices physically located at the physical banking center location of the financial institution comprises:

determining, by the at least one processor, that a customer of the portion of the customers of the financial institution at the first location of the physical banking center location of the financial institution is authorized to utilize one or more functions of one or more computing devices physically located at the first location of the physical banking center location of the financial institution; and determining, by the at least one processor, that a customer of the portion of the customers of the financial institution at the second location of the physical banking center location of the financial institution is authorized to utilize one or more functions of one or more computing devices physically located at the second location of the physical banking center location of the financial institution.

14. The method of claim 8, comprising receiving, via the communication interface and from the one or more computing devices physically located at the physical banking center location of the financial institution, one or more messages comprising data indicating that the one or more functions of the one or more computing devices physically located at the physical banking center location of the financial institution have been enabled for the or more customers of the customers of the financial institution at the physical banking center location of the financial institution.

15. The method of claim 9, wherein generating the one or more messages comprising the data identifying the computing device associated with the deposit drop box physically located at the physical banking center location of the financial institution, identifying the function configured to prepare the deposit drop box physically located at the physical banking center location of the financial institution to receive the deposit from the customer of the financial institution authorized to make deposits at the physical banking center location of the financial institution via the deposit drop box physically located at the physical banking center location of the financial institution, and instructing the computing device associated with the deposit drop box physically located at the physical banking center location of the financial institution to enable the function configured to prepare the deposit drop box physically located at the physical banking center location of the financial institution to receive the deposit from the customer of the financial institution authorized to make deposits at the physical banking center location of the financial institution via the deposit drop box physically located at the physical banking center location of the financial institution comprises generating one or more messages comprising data instructing the computing device associated with the deposit drop box physically located at the physical banking center location of the financial institution to enable a barcode scanner configured to scan a barcode associated with the deposit from the customer of the financial institution authorized to make deposits at the physical banking center location of the financial institution via the deposit drop box physically located at the physical banking center location of the financial institution.

16. The method of claim 13, comprising determining, by the at least one processor and based on at least a portion of the data indicating the physical presence of the customers of the financial institution at the physical banking center location of the financial institution, that at least one of the one or more customers of the customers of the financial institution at the physical banking center location of the financial institution has left the physical banking center location of the financial institution.

17. The method of claim 14, comprising, responsive to receiving the one or more messages comprising the data indicating that the one or more functions of the one or more computing devices physically located at the physical banking center location of the financial institution have been enabled for the or more customers of the customers of the financial institution at the physical banking center location of the financial institution:

generating, by the at least one processor, one or more messages indicating that the one or more functions of the one or more computing devices physically located at the physical banking center location of the financial institution have been enabled for the or more customers of the customers of the financial institution at the physical banking center location of the financial institution;

identifying, by the at least one processor and based on at least a portion of the data indicating the physical presence of the customers of the financial institution at the physical banking center location of the financial institution, one or more personal computing devices presently in possession of the one or more customers of the customers of the financial institution at the physical banking center location of the financial institution; and communicating, via the communication interface and to the one or more personal computing devices presently in possession of the one or more customers of the customers of the financial institution at the physical banking center location of the financial institution, the one or more messages indicating that the one or more functions of the one or more computing devices physically located at the physical banking center location of the financial institution have been enabled for the or more customers of the customers of the financial institution at the physical banking center location of the financial institution.

18. The method of claim 16, comprising, responsive to determining that at least one of the one or more customers of the customers of the financial institution at the physical banking center location of the financial institution has left the physical banking center location of the financial institution: generating, by the at least one processor, one or more messages comprising data identifying at least one of the one or more computing devices physically located at the physical banking center location of the financial institution, identifying at least one of the one or more functions of the at least one of the one or more computing devices physically located at the physical banking center location of the financial institution, and instructing the at least one of the one or more computing devices physically located at the physical banking center location of the financial institution to disable the at least one of the one or more functions of the at least one of the one or more computing devices physically located at the physical banking center location of the financial institution for the at least one of the one or more customers of the customers of the financial institution at the physical banking center location of the financial institution; and communicating, via the communication interface and to the at least one of the one or more computing devices physically located at the physical banking center location of the financial institution, the one or more messages comprising the data identifying the at least one of the one or more computing devices physically located at the physical banking center location of the financial institution, identifying the at least one of the one or more functions of the at least one of the one or more computing devices physically located at the physical banking center location of the financial institution, and instructing the at least one of the one or more computing devices physically located at the physical banking center location of the financial institution to disable the at least one of the one or more functions of the at least one of the one or more computing devices physically located at the physical banking center location of the financial institution for the at least one of the one or more customers of the customers of the financial institution at the physical banking center location of the financial institution.

19. An apparatus, comprising: at least one processor; a communication interface; and a memory storing instructions that when executed by the at least one processor cause the apparatus to:

receive, via the communication interface and from an indoor positioning system located at a physical banking center location of a financial institution, a plurality of messages comprising data indicating physical presence of customers of the financial institution at the physical banking center location of the financial institution;

determine that one or more customers of the customers of the financial institution at the physical banking center location of the financial institution are authorized to utilize one or more functions of one or more computing devices physically located at the physical banking center location of the financial institution; and communicate, via the communication interface and to the one or more computing devices physically located at the physical banking center location of the financial institution, instructions to enable the one or more functions of the one or more computing devices physically located at the physical banking center location of the financial institution for the one or more customers of the customers of the financial institution at the physical banking center location of the financial institution;

communicate via the communication interface to one or more personal computing devices in possession of the one or more customers of the financial institution at the physical banking center location of the financial institution, displaying on the one or more personal computing devices that the physical presence of the one or more customers has been detected, the identity of the one or more computing devices physically located at the physical banking center location of the financial institution that the one or more customers is authorized to use, and the identity of the one or more functions of the one or more the financial institution that the one or more customers is authorized to use.

20. One or more non-transitory computer-readable media having instructions stored thereon that when executed by one or more computers cause the one or more computers to:

receive, from a communication interface and an indoor positioning system located at a physical banking center location of a financial institution, a plurality of messages comprising data indicating physical presence of customers of the financial institution at the physical banking center location of the financial institution;

determine, based at least in part on the data indicating the physical presence of the customers of the financial institution at the physical banking center location of the financial institution, that one or more customers of the customers of the financial institution at the physical banking center location of the financial institution are authorized to utilize one or more functions of one or more computing devices physically located at the physical banking center location of the financial institution;

responsive to determining that the one or more customers of the customers of the financial institution at the physical banking center location of the financial institution are authorized to utilize the one or more functions of the one or more computing devices physically located at the physical banking center location of the financial institution, communicate, to the one or more computing devices physically located at the physical banking center location of the financial institution, instructions to enable the one or more functions of the one or more computing devices physically located at the physical banking center location of the financial institution for the one or more customers of the customers of the financial institution at the physical banking center location of the financial institution;

communicate via the communication interface to one or more personal computing devices in possession of the one or more customers of the financial institution at the physical banking center location of the financial institution, displaying on the one or more personal computing devices that the physical presence of the one or more customers has been detected, the identity of the one or more computing devices physically located at the physical banking center location of the financial institution that the one or more customers is authorized to use, and the identity of the one or more functions of the one or more computing devices physically located at the physical banking center location of the financial institution that the one or more customers is authorized to use;

determine that the one or more customers of the customers of the financial institution at the physical banking center location of the financial institution have left the physical banking center location of the financial institution; and responsive to determining that the one or more customers of the customers of the financial institution at the physical banking center location of the financial institution have left the physical banking center location of the financial institution, communicate, to the one or more computing devices physically located at the physical banking center location of the financial institution, instructions to disable the one or more functions of the one or more computing devices physically located at the physical banking center location of the financial institution for the one or more customers of the customers of the financial institution at the physical banking center location of the financial institution that have left the physical banking center location of the financial institution.

\* \* \* \* \*